United States Patent
Nguyen

(10) Patent No.: US 11,185,087 B2
(45) Date of Patent: Nov. 30, 2021

(54) COFFEE EXTRACT POWDER (INSTANT COFFEE) AND METHOD FOR PREPARING THE SAME USING A SMART HIGH-VOLUME COFFEE BREWING MACHINE AND A CONVECTION CURRENT FREEZE DRYING APPARATUS

(71) Applicant: VINAMIT USA LLC, Tigard, OR (US)

(72) Inventor: Vien Lam Nguyen, Ho Chi Minh (VN)

(73) Assignee: VINAMIT USA LLC, Tigard, OR (US)

( * ) Notice: Subject to any disclaimer, the term of this patent is extended or adjusted under 35 U.S.C. 154(b) by 0 days.

(21) Appl. No.: 16/947,405

(22) Filed: Jul. 30, 2020

(65) Prior Publication Data

US 2020/0359647 A1 Nov. 19, 2020

Related U.S. Application Data

(63) Continuation-in-part of application No. 16/258,639, filed on Jan. 27, 2019, now Pat. No. 10,921,058, and a continuation-in-part of application No. 16/371,079, filed on Mar. 31, 2019.

(51) Int. Cl.
*A23F 5/40* (2006.01)
*A23F 5/32* (2006.01)

(52) U.S. Cl.
CPC .............. *A23F 5/405* (2013.01); *A23F 5/32* (2013.01)

(58) Field of Classification Search
CPC .................................. A45F 5/405; A45F 5/32
USPC ........................................................ 34/284
See application file for complete search history.

(56) References Cited

U.S. PATENT DOCUMENTS

| 3,652,292 A | * | 3/1972 | Bach | A23F 5/08 |
| | | | | 426/594 |
| 3,799,049 A | * | 3/1974 | Smith, Jr. | A23F 5/12 |
| | | | | 99/470 |
| 4,100,305 A | * | 7/1978 | Gregg | A23F 5/265 |
| | | | | 426/385 |
| 4,281,023 A | * | 7/1981 | Pyves | A23F 5/285 |
| | | | | 426/385 |

(Continued)

FOREIGN PATENT DOCUMENTS

| DE | 3737109 A1 | * | 5/1989 | ............... A23F 5/34 |
| EP | 0314974 A3 | * | 5/1990 | ............... A23F 5/34 |
| JP | 01153043 A | * | 6/1989 | ............... A23F 5/34 |

*Primary Examiner* — Stephen M Gravini

(57) ABSTRACT

A concentrated coffee extract powder (instant coffee) and a system for producing the same are disclosed which includes: selecting and preparing coffee beans by a predetermined quality guideline; receiving a coffee extract by inputting the coffee beans into a high-volume coffee brewing machine a high-volume coffee brewing machine having a plurality of percolation tanks whose fluid inter-communication is controlled by a a Boolen logic performed by a proportional integral derivative controller (PIDC) after receiving time, temperature, and pressure data from the plurality of percolation tanks so that the coffee extract is qualitatively constant in each of said plurality of percolation tanks; freezing the coffee extract mixed with the probiotics in molds using an individual quick freezer (IQF) to obtain frozen coffee extract blocks; and vacuum freezing the frozen coffee extract blocks using a convection current vacuum freeze drying apparatus.

20 Claims, 6 Drawing Sheets

(56) References Cited

U.S. PATENT DOCUMENTS

| | | | | |
|---|---|---|---|---|
| 5,132,135 | A * | 7/1992 | Schweinfurth | A23F 5/34 |
| | | | | 426/385 |
| 6,979,472 | B2 * | 12/2005 | Apiscopa | A23F 5/243 |
| | | | | 426/387 |
| 7,056,546 | B2 * | 6/2006 | Zheng | A23F 5/243 |
| | | | | 426/534 |
| 9,017,750 | B2 * | 4/2015 | Wang | A23G 1/52 |
| | | | | 426/103 |
| 10,451,346 | B1 * | 10/2019 | Nguyen | F26B 5/065 |
| 10,676,797 | B1 * | 6/2020 | Nguyen | C13B 10/025 |
| 10,921,058 | B2 * | 2/2021 | Nguyen | F26B 5/06 |
| 10,966,439 | B2 * | 4/2021 | Lam Nguyen | A23L 2/14 |
| 2005/0109857 | A1 * | 5/2005 | Boone, Jr. | A47G 21/18 |
| | | | | 239/16 |
| 2007/0248731 | A1 * | 10/2007 | Curti | A23F 5/46 |
| | | | | 426/533 |
| 2020/0359647 | A1 * | 11/2020 | Nguyen | A23F 5/32 |
| 2021/0037866 | A1 * | 2/2021 | Zhang | A61Q 19/00 |

* cited by examiner

COFFEE EXTRACT POWDER (INSTANT COFFEE) AND METHOD FOR PREPARING THE SAME USING A SMART HIGH-VOLUME COFFEE BREWING MACHINE AND A CONVECTION CURRENT FREEZE DRYING APPARATUS

CLAIM OF PRIORITY

This application is a continuation application-in-part (CIP) under 35 U.S.C. § 120 of application Ser. No. 16/258,639, entitled "Fully Automatic Convection Current Freeze Drying Method", filed on Jan. 27, 2019 which is a continuation application of application Ser. No. 16/371,079, entitled, "Convection Current Freeze Drying Apparatus and Method of Operating the Same", filed on Mar. 31, 2019. The patent applications identified above is incorporated here by reference in its entirety to provide continuity of disclosure.

FIELD OF THE INVENTION

The present invention relates generally to method of manufacturing instant coffee powder. More particularly, this invention relates to the use of a high-volume smart coffee brewing machine and a convection current freeze drying apparatus.

BACKGROUND ART

Coffee is one of the world's most popular beverages. Over 2.25 billion cups of coffee are consumed in the world everyday. In Vietnam, coffee is considered as a part of work and life. Vietnamese enjoy coffee while working, meeting, discussing business with partners, and leisurely chatting with friends, and/or while entertaining.

Coffee not only tastes good and gives consumers a serious jolt of energy, but it also has plenty of health benefits. Two cups of coffee can cut post-workout muscle pain by up to 48%. A cup of brewed coffee contributes up to 1.8 grams of fiber of the recommended intake of 20-38 grams. Coffee has the liver protecting benefits. People who consume 6 or more cups of coffee per day have a 22% lower risk of diabetes. Caffeine may protect agains Alzheimer's disease by preventing the build-up of the brain plaque believed to cause the disease. Coffee drinkers are 20% less likely to suffer from depression and risk of suicide. People with Parkinson's disease are less likely to be coffee drinkers. In other words, caffeine combined with Eicosanoyl-5-hydroxytryptamide (EHT, a compound found in coffee beans) provides protective benefits against Parkinson's disease and dementia. The consumption of at last three cups of coffee a day tend to develop less calcification in the coronary arteries. Coffee drinkers have DNA with stronger integrity since the white blood cells of coffee drinkers had far fewer instances of spontaneous DNA strand breakage. Coffee can prevent the neural inflammation that possibly leads to the development of multiple sclerosis (MS). Even moderate consumption of coffee can reduce the odds of developing colorectal cancer by 26%.

Given such health benefits of drinking coffee, preserving fresh brewed coffee in large industrial scale is necessary since brewing a good cup of coffee is not easy. It requires a certain amount of water at a certain amount of temperature (90° C.) that is forced through a coffee pod at a nominal pressure of 9 bars. That is why instant coffee accounts for more than 50% of all coffee consumption in some countries. Instant coffee is also faster, cheaper (per cup), and easier to prepare than reqular coffee. Instant coffee is a type made by three different methods. In the first method, coffee beans is ground into a fine powerder. However, it is well-known that pre-ground coffee beans are easy to loose 80% of their flavors, oils, and aromas within a short period of time. In the second method—the spray drying method (SD)—the coffee extract is sprayed into hot air, which quickly dries the droplets and turns them into fine powderer or small pieces. Finally, in the third method—the free-drying method (SFD)—the coffee extract is frozen and cut into small fragments, which are then dried at a lower temperature under vacuum conditions. The commercially available instant coffee manufactured by the above described methods—in bags or in jars—taste very bad and they contain more acrylamide ($C_3H_5NO$) which is potentially harmful chemical that forms when coffee beans are roasted over an extended periods of time.

If the vacuum freeze drying of coffee extract is done property, the concentrated coffee powder is easy to store at temperatures without the need of refrigeration. In addition, the essence and flavor of the product are also intact. However, the vacuum freeze drying process are complex and requires expensive and specialized equipments, especially in the commercial scale. If the vacuum freeze drying process is not performed properly, the following problems may occur: (1) when the cooling rate is not sufficiently fast, the formation of large ice crystals can cause the freeze dried coffee extracts to be brittle and destroy the microscopic structures of coffee; (2) when the cooling temperature is not below the eutectic temperature, water and unwanted solutes will not be completely removed, rendering the entire process ineffective; (3) when the pressures and temperatures are not carefully controlled, the coffee extracts may collapse, destroying the product. In addition, the conventional vacuum freeze driers are largely controlled by human interfaces which can cause the above problems; and (4) each product requires different temperatures, pressures, and settings for being properly freeze dried, e.g., freeze drying coffee extracts is different from other products because coffee extracts contain more liquid than other products; using generic and default settings for different products would likely render the freeze drying process ineffective and uneconomical.

The manufacturing of instant coffee in the industrial scale has been confounded with many problems including capacity, uniformity, and aroma preservation. In instant coffee plants, coarsely ground coffee is extracted with softened water in a battery of 5-8 percolation columns, with cell capacity from a few kilogram up to 1 ton. In the small scale production of a few kilogram, the quality of the coffee extract is more uniform but it does not meet the output requirement. On the contrary in the large scale production of one ton, the output requirement is met but the quality of the coffee extract from different percolation columns are not uniform. Often, post-extraction processes such as emulsification are involved to correct the degradation in the coffee aroma.

Therefore, what is needed is a method and a system that can convert coffee extract to concentrated coffee powder which is chemically stable, has a long shelve life, short reconstitution time with excellent potency levels—the original flavor, nutrients, vitamins, aroma, and color of the coffee extract are preserved.

What is needed is a system that includes an industrial scale coffee brewing machine that has a high extraction efficiency, high output capacity, and uniform coffee aroma.

What is needed is a system that are fully automatic, i.e., controlled and observed by a controller unit or a computer, that can create optimal freeze drying conditions for coffee extract.

What is needed is system that can provide a high rate of cooling so that the microscopic structures of coffee extract are preserved.

Yet, what is needed is a system that can provide specific settings including eutectic temperatures ($T_{eu}$), optimal temperatures ($T_{opt}$), pressures, and cooling rates for coffee extract so that structural collapse can be avoided.

Finally, what is needed is a coffee extract composition powder that includes probiotics so that it is easy to digest after reconstitution by mixing with water.

The method and system disclosed in the present invention solve the above described problems and fulfill long-felt market needs.

SUMMARY OF THE INVENTION

Accordingly, an object of the present invention is to provide a concentrated coffee extract powder (instant coffee) which includes: selecting and preparing coffee beans by a predetermined quality guideline; receiving a coffee extract by inputting the coffee beans into a high-volume coffee brewing machine having a plurality of percolation tanks whose fluid inter-communication is controlled by a Boolean logic of a proportional integral derivative controller (PIDC) after receiving time, temperature, and pressure data from the plurality of percolation tanks so that the coffee extract is qualitatively preserved; freezing the coffee extract mixed with the probiotics in molds using an individual quick freezer (IQF) to obtain frozen coffee extract blocks; and vacuum freezing the frozen coffee extract blocks using a convection current vacuum freeze drying apparatus.

Another object of the present invention is to provide a method for preparing a concentrated coffee extract powder (instant coffee) that includes: selecting and preparing coffee bean by a predetermined quality guideline; receiving coffee extract by inputting the coffee beans into a high-volume coffee brewing machine having a plurality of percolation tanks whose fluid inter-communication is controlled by a Boolean logic performed by a proportional integral derivative controller (PIDC) after receiving time, temperature, and pressure data from the plurality of percolation tanks so that the coffee extract is qualitatively constant in each of said plurality of percolation tanks; freezing the coffee extract mixed with the probiotics in molds using an individual quick freezer (IQF) to obtain frozen coffee extract blocks; and vacuum freezing said frozen coffee extract blocks using a convection current vacuum freeze drying apparatus.

Another object of the present invention is to provide a system for manufacturing concentrated coffee extract powder that includes: a high-volume coffee brewing machine having a plurality of percolation tanks whose fluid inter-communication is controlled by a Boolean logic calculated by a proportional integral derivative controller (PIDC) after receiving time, temperature, and pressure data from the plurality of percolation tanks so that the coffee extract is qualitatively constant in each of said plurality of percolation tanks; an individual quick freezer (IQF); and a convection current vacuum freeze drying apparatus with a condenser that have a high rate of cooling using heat transfer of natural convection currents between the condenser unit and a plurality of elongate tubes having circumferential fins.

Yet another of the present invention is to provide a high-volume coffee brewing machine that is fully controlled by a proportional integral derivative controller (PIDC) so as to produce uniform quality and aroma of the coffee extract from different percolation units.

Still, another object of the present invention is to achieve a computer software program stored in a non-transitory memory of the PIDC that can fully control the high-volume coffee brewing machine and its coffee extraction process.

Another object of the present invention is to achieve a vacuum freeze drying apparatus and process that are fully automatic, i.e., controlled and observed by a controller unit or computer that can create optimal freeze drying conditions for coffee extract.

Another object of the present invention is to achieve a vacuum freeze drying apparatus and method that can provide a high rate of cooling using heat transfer of natural convection currents between the condenser unit and a plurality of elongate tubes having circumferential fins.

Furthermore, another object of the present invention is to achieve a vacuum freeze drying apparatus and process that can provide a deep and uniform freezing zone of the same temperature and pressure so that the quality of the coffee extract being freeze dried is uniform.

Yet, another object of the present invention is to achieve a vacuum freeze drying apparatus and process that can provide specific settings including temperatures, pressures, and cooling rates for coffee extract so that structural collapse can be avoided.

Another object of the present invention is to provide a concentrated coffee extract powder mixed with a predetermined amount of probiotics that improves digestive health, and powerful benefits for body and brain.

Finally, another object of the present invention is to achieve a computer software program stored in a non-transitory memory that can perform an optimal convection current vacuum freeze drying process for coffee extract when such computer software program is executed by a controller unit.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
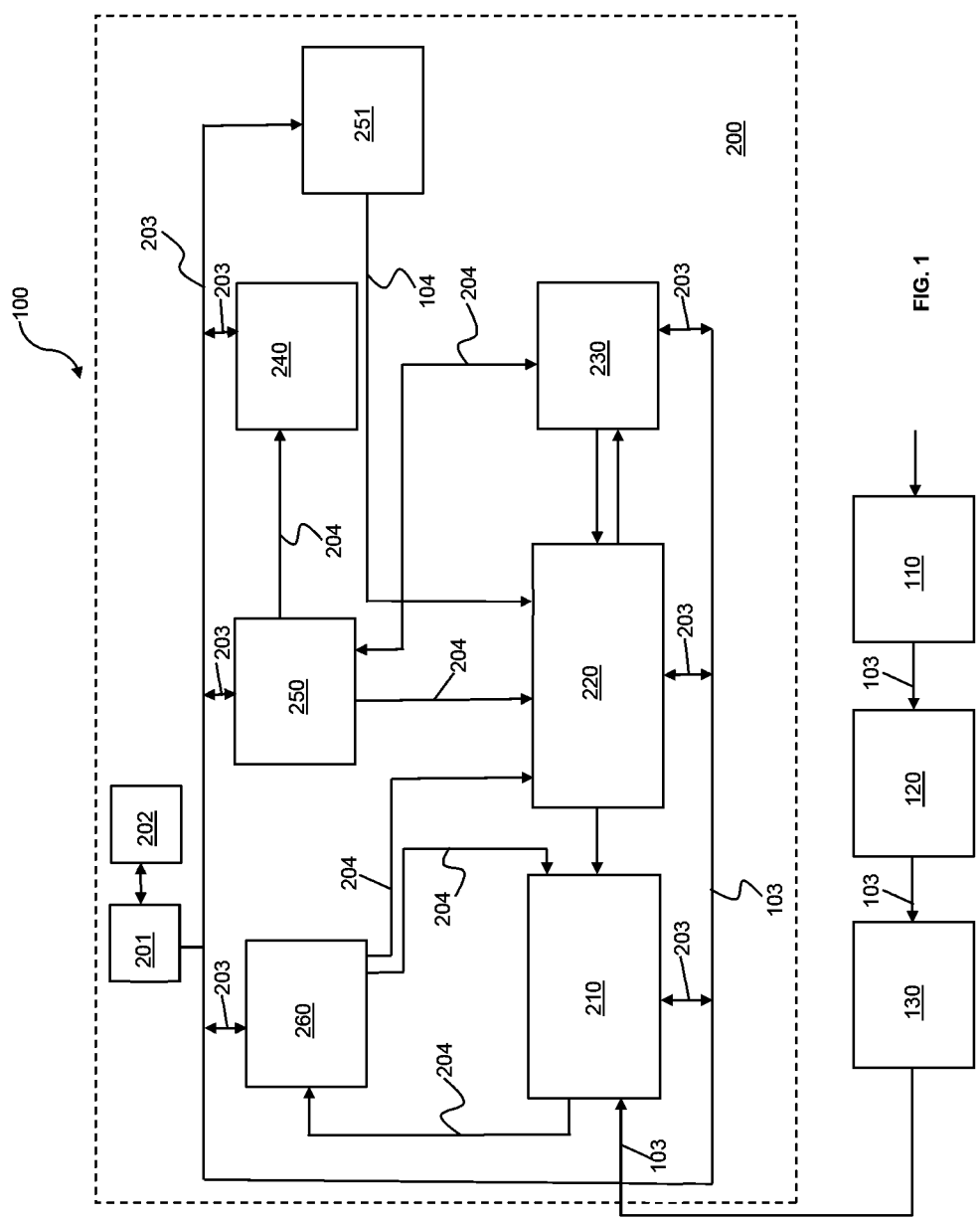
FIG. 1 is a block diagram illustrating a system for preparing concentrated coffee extract powder using a convection current vacuum freeze drying apparatus and a high-volume smart coffee brewing machine in accordance with an embodiment of the present invention.

One embodiment of the invention is now described with reference to FIG. 1. FIG. 1 illustrates a block diagram of a system 100 for preparing concentrated coffee extract powder using a convection current vacuum freeze drying apparatus and a smart high-volume coffee brewing machine having a plurality of percolation tanks whose fluid inter-communication is controlled by a Boolean logic $\{\Delta Brix\% < BRIX_{TH})^1 \cap (Brix\% \geq BRIX_L)^2\}$ performed by a proportional integral derivative controller (PIDC) after receiving time, temperature, and pressure data from the plurality of percolation tanks so that the extraction yield percentage (%) is constant. System 100 includes a coffee bean selection and preparation station 110, a high-volume brewing coffee machine 120, a pre-freezing individual quick freezer (IQF) 130, and a convection current vacuum freeze drying apparatus 200. In various embodiments of the present invention, preparation station 110 includes visual inspection performed by human operators in combination with Brix measurements refractometer. In some other exemplary embodiments, preparation station 110 includes a customized and integrated coffee beans selecting and packing system of different coffee beans/blends/roasts with built-in Brix measurement unit and coffee extract parameters and guidelines. The customized and integrated coffee beans selecting and packing system is equipped with high-resolution cameras and classifies each coffee beans with the highest efficiency and accuracy, ensuring an unprecedented selection accuracy. Avoiding invasive processes, this technology can take into account and connect an extraordinary complexity of parameters, including: size, color, shape, and integrity, degree of ripeness, internal and external defects, residues, and shininess, depending on the types of coffee (*Robusta* or *Arabica*, regions of origin). The predetermined selection guidelines and parameters for coffee beans are disclosed in Table 1 below.

TABLE 1

Predetermined Preparation Guidelines for Coffee Beans/Blends/Roasts

| Products | Preselection Guidelines | Additives |
| --- | --- | --- |
| Coffee Beans/Blends/Roasts | Select fresh, shiny, coffee beans with little residues. Mix different types of coffee beans (*Robusta*, *Arabica*, regions) to create coffee blends with different aromas and tastes. Roast the coffee blends to 90° C. for 20-25 minutes. Grind the roasted coffee blends into fragments of 0.2-0.5 mm. | Probiotics (*Lactobacillus*, *Streptococus*, *Bifidobacterium*), Malto syrups 10%-20%, sugar depending on sweetness versus sourness |

Continuing with FIG. 1, in many exemplary embodiments of the present invention, convection current vacuum freeze drying apparatus 200 further includes a dryer chamber unit 210, an ice condenser unit 220, a refrigerator unit 230, a cooling tower unit 240, a vacuum pump unit 250, and a heater unit 260, all connected together by mechanical connectors 103. In various embodiments of the present invention, mechanical connectors 103 are hollow tubes of different shapes and sizes that facilitate the flowing of fluids between the units. In some embodiments of the present invention, system 100 also includes a controller unit 201 and a database 202. Database 202 is configured to contain specific vacuum freeze drying settings for coffee beanss which have specific vacuum freeze drying settings including triple point temperatures, eutectic temperatures ($T_{eu}$), drying times, freezing rate, pressure, etc. which are studied beforehand and stored in database 202. When a specific coffee extract is selected to be vacuum freeze dried, specific vacuum freeze drying settings stored in database 202 will be loaded into controller unit 201. Afterwards, controller unit 201 uses the specific vacuum freeze drying settings to operate system 100 in accordance to a specific process designed for a specific coffee extract. It is noted that different types of coffee extracts different types of coffee beans/blends/roasts not mentioned within the present disclosure and their specific vacuum freeze dried settings are also within the scope of the present invention. Yet, in many embodiments of the present invention, mechanical connectors 103 also connect sensing devices such as temperature sensors, pressure sensors, flow meters, timing devices, switches, and valves that can communicate with and be controlled by controller unit 201. The detailed description of these sensing devices and an exemplary embodiment of system 100 will be disclosed in FIG. 2.

Continuing with FIG. 1, the main feature of the present invention lies in smart high-volume coffee brewing machine 120, convection current ice condenser unit 220, controller unit 201, database 202, and the specific operating process for coffee extract. In various embodiments of the present invention, smart high-volume coffee brewing machine 120 having a plurality of percolation tanks whose fluid inter-communication is controlled by a Boolean logic $\{\Delta \text{Brix \%} < \text{BRIX}_{TH})^1 \cap (\text{Brix \%} \geq \text{BRIX}_L)^2\}$ performed by a proportional integral derivative controller (PIDC) after receiving time, temperature, and pressure data from the plurality of percolation tanks so that the coffee extract is qualitatively preserved. It is noted that, in the present invention, the term "qualitatively preserved" means extract yield percentage (%), flavor, aroma, and nutrients are kept substantially constant. Extraction yield % is defined as the amount of brewed coffee (kg) multiplied by the percentage of total dissolved solid (TDS) divided by dose (kg). The amount of brewed coffee means how much liquid is actually contained in the coffee extract. Dose means the amount of coffee beans (in kg) is used. TDS is the strength of the coffee extract and measured by the refractometer (Brix %) or TDS meter.

It is noted that the Boolean logic described above can be used with different identities for measuring the strength of coffee extracts such as extraction, extraction yield %, TDS, strength, brew ratio. Extraction is known as "solubles yield" or "Extraction Yield". It is the percentage (by weight) of the grounds are dissolved in the water. Put simply, how much of the coffee beans/blends in percolation tanks 401-1 to 401-4 ends up in output tanks 408-1 to 408-4 respectively. Extraction yield % is the percentage by mass of coffee grounds that ends up dissolved in the brewed coffee. Extraction yield %=Brewed Coffee[g]×TDS [%]/Coffee Grounds[g]. Total Dissolved Solids (TDS) is expressed in parts per million (ppm). Strength is also known as "solubles concentration", as measured by TDS how concentrated or watery the coffee is. Brew ratio is the ratio of coffee grounds (mass) to water (volume): how much coffee is used for a given quantity of water. This may be expressed in units of either grams per liter or ounces per US half gallon. These are related as follows: Strength=Brew ratio×Extraction which can be analyzed as the following identity: dissolved solids/water=grounds/water×dissolved solids/grounds.

In many embodiments of the present invention, convection current ice condenser unit 220 includes a plurality of first elongate heat exchange tubes with fins arranged around the outer circumference of the first elongate heat exchange tubes so that natural convection currents optimize the heat exchange between cold airs from refrigerator unit 230, ice condenser unit 220, and dryer unit 210. As a result, the following objects of the present invention are achieved:

Consistent extraction percentage is achieved, thus aroma, flavor, taste, and nutrients are maintained throughout.

A uniformly distributed and constant cold air is created throughout the entire ice condenser unit 220 and dryer unit 210;

The freezing rate can be exactly controlled;

Coffee extracts are vacuum freeze dried homogeneously without undesired quality variations due to location difference as in conventional vacuum freeze drying systems; and Furthermore, since specific vacuum freeze drying settings for coffee extract can be learned beforehand and stored in database 202, controller unit 201 can execute the vacuum freeze drying process for different coffee extracts from different types/blends/roasts in a precise manner and settings. As such, additional objects of the present invention are achieved:

The essence of coffee extract is captured at the moment coffee extract is at its best quality, before degradation and oxidation starting. Coffee extract quality and essence are changed with time as they are exposed to air. If the vacuum freeze drying is either too slow or too fast, the essence of the vacuum freeze dried coffee extract is lost. Equipped with the exact vacuum freeze drying rate, time, and settings and stored them in database 202, controller unit 201 can execute processes encoded in computer programs to capture coffee extract at their best qualities. The processes will be described in details in FIG. 5 and FIG. 6.

Figure 2:
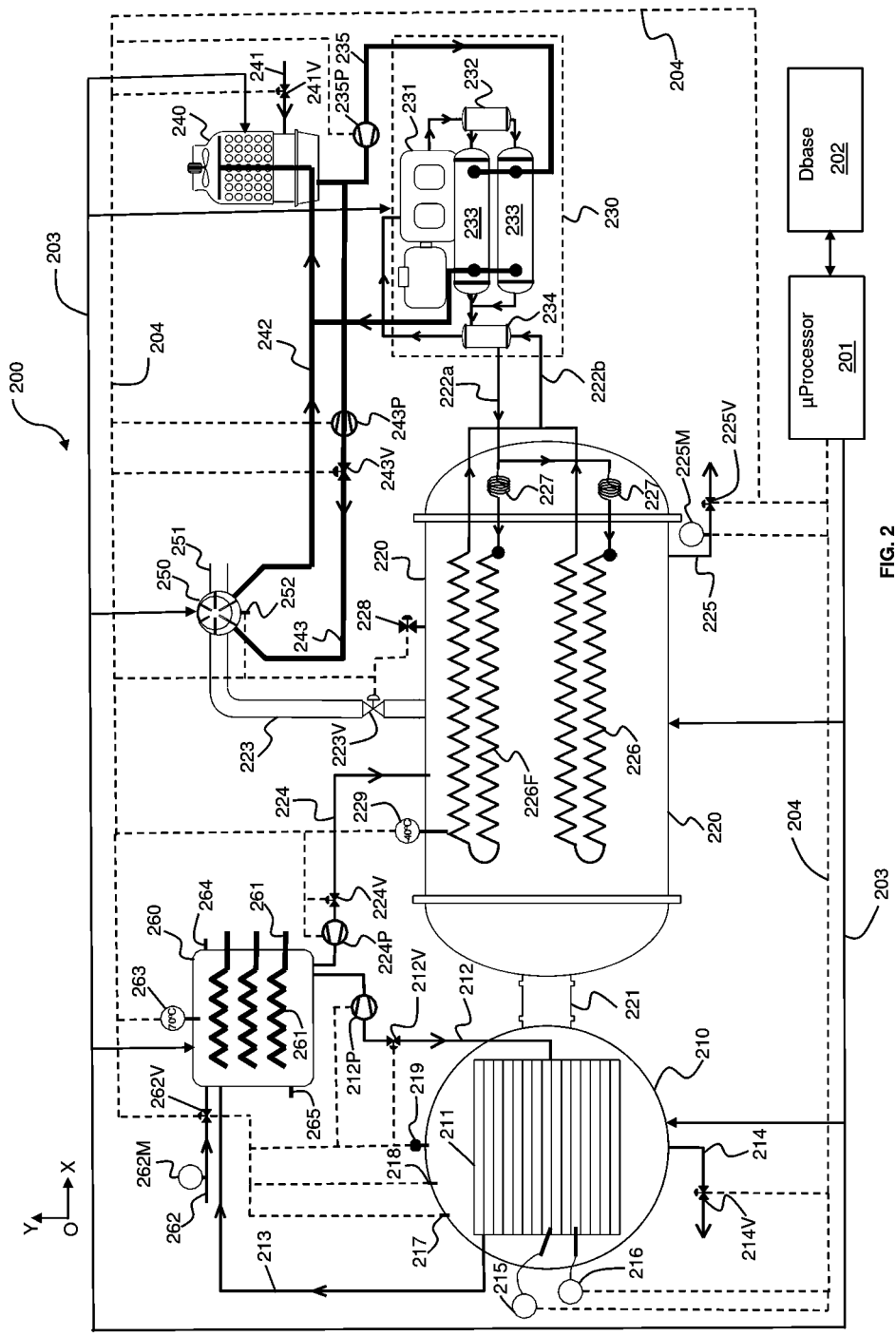
FIG. 2 is a schematic diagram of a convection current vacuum freeze drying apparatus used to dry blocks of frozen coffee extract in accordance with an exemplary embodiment of the present invention.

Now referring to FIG. 2, a schematic diagram of a (natural) convection current vacuum freeze drying apparatus ("CCVFD apparatus") 200 in accordance with an exemplary embodiment of the present invention is illustrated. Convection current vacuum freeze drying apparatus 200 ("CCVFD apparatus 200") includes dryer unit 210, a convection current condensing unit (ice condenser unit) 220, a refrigerator unit 230, a cooling tower unit 240, a vacuum pump unit 250, and a heater unit 260. In various embodiments of the present invention, apparatus 200 is not a stand-alone device. It is a network-based device that is connected to a controller unit 201 and a database 202 in a network (not shown). The network can be a wide area network (WAN), a local area network (LAN), a wireless sensor network (WSN), Internet of Things (IoT), or a cloud-based network. Furthermore, ice condenser unit 220 includes a plurality of first elongate tubes with fins that accelerate the heat exchange by natural convection currents between the cold temperatures inside ice condenser unit 220 and refrigerator unit 230, providing fast cooling rate and uniformly distributed cold air.

Continuing with FIG. 2, controller unit 201 and database 202 are connected to CCVFD apparatus 200 by communication channels 203. Sensors described below are connected to controller unit 201 by communication channels 204. Communication channels 204 are wireless communication channels such as Wi-fi, Bluetooth, RF, optical, Zigbee, IoT, etc. In some embodiments, communication channels 204 maybe data transmission cables such as RS-232, RS-422, or RS-485, etc.

Controller unit 201 serves as the brain of convection current vacuum freeze drying apparatus 200. In some exemplary embodiments, controller unit 201 is a—16 or—32 bit Programmable Logic Controller (PLC), a Supervisory Control and Data Acquisition (SCADA), or any other type of programmable logic array (PLA) consisting of a memory chip and integrated circuits for control logic, monitoring, and communicating. Controller unit 201 directs the programmable logic controller (PLC) and/or to execute control instructions, communicate with other units, carry out logic and arithmetic operations, and perform internal diagnostics. Controller unit 201 runs memory routines, constantly checking the PLC to avoid programming errors and ensure the memory is undamaged. Memory provides permanent storage to the operating system for database 202 used by controller unit 201. Five programming languages are used in controller unit 201 and PLC. They are defined by the international standard IEC 61131. Ladder logic is one of the most commonly used PLC languages. Another programming language is function block diagram (FBD). It describes functions between input and output variables. The function, represented by blocks, connects input and output variables. FBD is useful in depicting algorithms and logic from interconnected controls systems. Structured Text (ST) is a high-level language that uses sentence commands. In ST, programmers can use "if/then/else," "SQRT," or "repeat/until" statements to create programs. Instruction list (IL) is a low-level language with functions and variables defined by a simple list. Program control is done by jump instructions and sub-routines with optional parameters. Sequential Function Chart (SFC) language is a method of programming complex control systems. It uses basic building blocks that run their own sub-routines. Program files are written in other programming languages. SFC divides large and complicated programming tasks into smaller and more manageable tasks.

Dryer unit 210 includes trays 211, a hot water pipe 212, a freeze dried chamber-heater hot water valve 212V ("hot water valve 212V"), a freeze dried chamber-heater hot water pump 212P ("hot water pump 212P"), a return water pipe 213, a discharge water pipe 214, a discharge water valve 214V, a first tray temperature transmitter 215, a second tray temperature transmitter 216, a front door switch 217, a rear door switch 218, a vacuum pressure transmitter 219, all connected as shown in FIG. 2. Hot water valve 212V, hot water pump 212P, discharge water valve 214V, first tray temperature transmitter 215, second tray temperature transmitter 216, front door switch 217, rear door switch 218, vacuum pressure transmitter 219 are network devices (e.g., IoT-based) that can communicate with controller unit 201.

Continuing with FIG. 2, convection current condensing unit (ice condenser unit) 220 connects to dryer unit 210 by a large ice condenser and freeze dried chamber connection pipe 221. Ice condenser unit 220 is connected to refrigerator unit 230 via a liquid refrigerant pipe 222a, a gaseous refrigerant pipe 222b, expansion capillary tubes 227; to vacuum pump unit 250 via a vacuum pipe 223, a vacuum isolating valve 223V; to heater unit 260 via an ice condenser heater hot water pipe 224, an ice condenser heater hot water valve 224V, an ice condenser heater hot water pump 224P, an ice condenser discharge valve 225, an ice condenser discharge flow meter 225M, and an ice condenser discharge valve 225V. Ice condenser unit 220 further includes convection current heat exchanging tubes with fins 226F, convection current heat exchanging tubes without fins 226, a vacuum release valve 228, and an ice condenser temperature transmitter 229. In many embodiments, vacuum isolating valve 223V, ice condenser heater hot water valve 224V, ice condenser heater hot water pump 224P, ice condenser discharge valve 225, ice condenser discharge flow meter 225M, and ice condenser discharge valve 225V, vacuum release valve 228, and ice condenser temperature transmitter 229 are network devices controlled by controller unit 201.

Still referring to FIG. 2, refrigerator unit 230 includes a compressor 231, a refrigerant container 232, a liquid refrigerant heat exchanger 233, a refrigerant heat exchanger 234, a cooling water pipe 235, a cooling water pump 235P. Cooling water pump 235B is network device that can be controlled by controller unit 201.

Still referring to FIG. 2, cooling tower unit 240 includes a feed water pipe 241, a feed water valve 241V, a hot water returning pipe 242, a cooling water pipe for vacuum pump unit 243, a cooling water pump for vacuum pump unit 243P, a cooling water valve for vacuum pump unit 243V. Feed water valve 241V, cooling water pipe for vacuum pump unit 243, cooling water pump 243P, a cooling water valve 243V are network devices which can be controlled and communicated to controller unit 201. Vacuum pump unit 250 includes a vacuum input pipe 251 and a current transformer transmitter which is network device. Water heater unit (heater) 260, a three-phase heating element 261, a feed water pipe 262, a feed water flow meter 262M, a feed water valve 262V, a heater temperature transmitter 263, a high water level sensor 264, and a low water level sensor 265 which are also network devices. In some embodiment of the present invention, a Hanbell vacuum type PS1302-AC1 with pumping speed of 15700 L/m, power source of 389V at 50 Hz, and ultimate pressure of 0.00075 torr is used.

In operation, apparatus 200 is fully controlled by controller unit 201 as described in details in processes 500 and 600 below. In other words, in various embodiments of the present invention, process 600 including operational steps 601 to 620 are implemented by apparatuses 100 and 200. The detailed description of apparatus 200 is described in application Ser. No. 16/258,639, entitled "Fully Automatic Convection Current Freeze Drying Method", filed on Jan. 27, 2019 which is a continuation application of application Ser. No. 16/371,097, entitled, "Convection Current Freeze Drying Apparatus and Method of Operating the Same", filed on Mar. 31, 2019. These patent applications identified above is incorporated here by reference in its entirety to provide continuity of disclosure.

Figure 3:
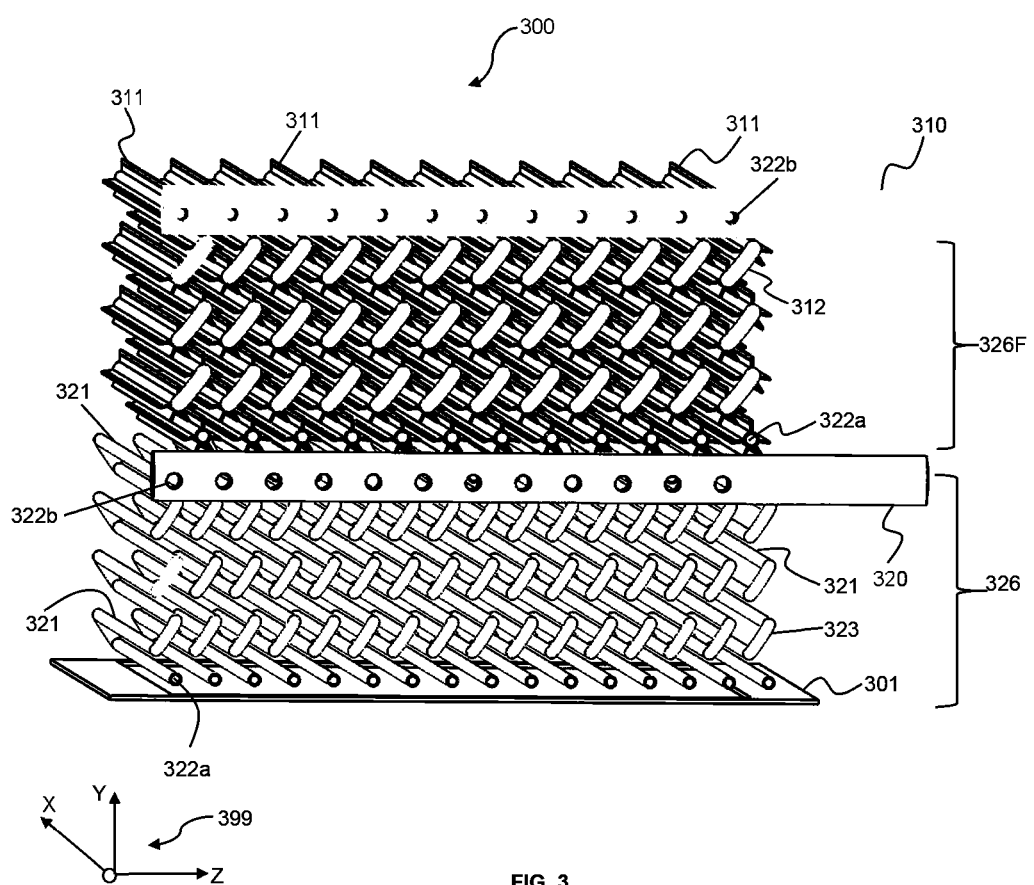
FIG. 3 is a three-dimensional (3D) perspective diagram of the internal structure of the ice condenser unit of the convection current vacuum freeze drying apparatus used to dry blocks of frozen coffee extract in accordance with an exemplary embodiment of the present invention.

Now referring to FIG. 3, a three-dimensional diagram of the internal structure 300 of the convection current ice condenser unit 220 in accordance with an exemplary embodiment of the present invention is illustrated. Internal structure 300 includes a rectangular base 301 spanning along a horizontal z-direction of a xyz coordinate 399. An array of first elongate heat exchange tubes with fins 326F and an array of second elongate heat exchange tubes without fins 326 are stacked on top of each other and rectangular base 301. Specifically, array of first elongate heat exchange tubes with fins 326F is a three-dimensional M×N array, where M is the number of first elongate heat exchange tubes with fins 311 along the z-direction and N is the number of first elongate heat exchange tubes with fins 311 along the vertical Y direction. Each first elongate heat exchange tubes with fins 311 has a length L spanning along the X direction. In one exemplary embodiment, M is 12, N is 8, and L is 30 mm. In other words, the number of first elongate heat exchange tubes with fins 311 in a row along the Z direction is 12. The number first elongate heat exchange tubes with fins 311 in a column along the Y direction is 8. The length of first elongate heat exchange tubes with fins 311 is 30 mm. Together, the number of first elongate heat exchange tubes with fins 311 in rows Z and in columns Y and their length L form three-dimensional array 326F.

Continuing with FIG. 3, array of second elongate heat exchange tubes without fins 326 is a three-dimensional M×N array, where M is the number of second elongate heat exchange tubes without fins 321 along the z-direction and N is the number of second elongate heat exchange tubes without fins 321 along the vertical Y direction. Each second elongate heat exchange tubes without fins 321 has a length L spanning along the X direction. In one exemplary embodiment, M is 16, N is 8, and L is 30 mm. In other words, the number of second elongate heat exchange tubes without fins 321 in a row along the Z direction is 16. The number of second elongate heat exchange tubes without fins 321 in a column along the Y direction is 8. The length of second elongate heat exchange tubes without fins 321 is 30 mm. Together, the number of second elongate heat exchange tubes without fins 321 in rows Z and in columns Y and their length L form three-dimensional array 326.

Figure 4:
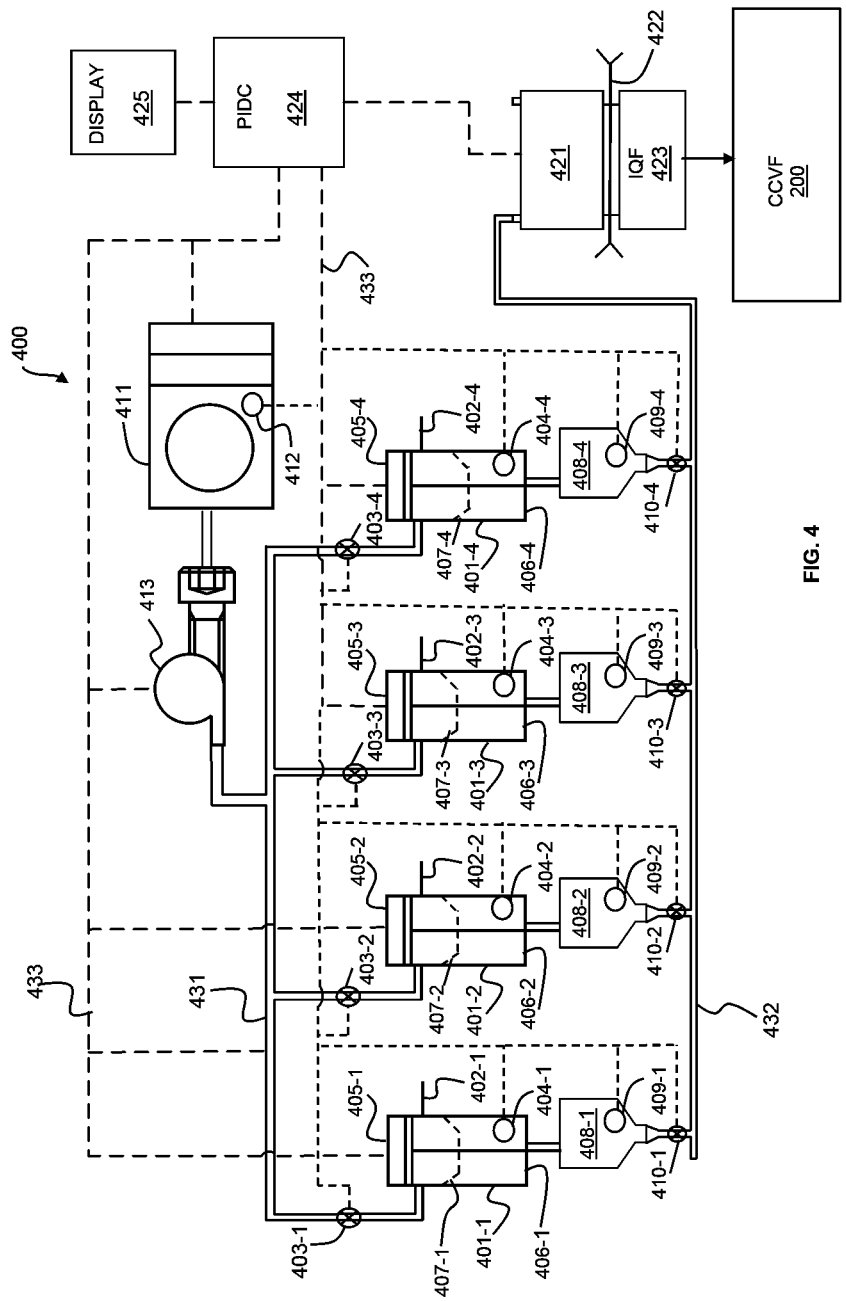
FIG. 4 is a two-dimensional (2D) perspective diagram of a high-volume smart coffee brewing machine in accordance with an exemplary embodiment of the present invention.

Now referring to FIG. 4, a three-dimensional (3D) perspective diagram of a smart high-volume coffee brewing machine 400 is illustrated in accordance with an exemplary embodiment of the present invention. Smart high-volume coffee brewing machine 400 includes a hot water boiler 411, a water pump 413, a plurality of percolation tanks 401-1 to 401-4, a plurality of filters 407-1 to 407-4, a post-extraction station 421, proportional integral derivative controller (PIDC) 424, and a display unit 425. Input copper tubes 431 are configured to mechanically couple and enable fluid communication between hot water boiler 411, water pump 413, plurality of percolation tanks 401-1 to 401-4. Output copper tubes 432 are configured to mechanically couple and enable fluid communication between output tanks 408-1 to 408-4 and post-extraction station 421. At the input terminal, input valves and pumps 403-1 to 403-4 are used to control the fluid communication not only between water pump 412 but also among percolation tanks 401-1 to 401-4. At the output terminal, output valves and pumps 410-1 to 410-4 are used to control the fluid communication between output tanks 408-1 to 408-4 among themselves and post-extraction station 421. A temperature and pressure sensor 412 is deposited for detecting the temperature and pressure inside hot water boiler 411. Similarly, temperature and pressure sensors 404-1 to 404-4 are placed to measure the temperature and pressure inside respective percolation tanks 401-1 to 401-4. Structurally, each percolation tank 401-1 to 401-4 is a stainless steal cylindrical tank having a lid 405-1 to 405-4 and a bottom side 406-1 to 406-4 respectively. Input terminals 402-1 to 402-4 are configured to input coffee beans/blends selected according to the predetermined standard described in table 1 above. Inside each percolation tank 401-1 to 401-4, filters 407-1 to 407-4 are removably placed to contain the coffee beans input from input terminals 402-1 to 402-4. Hot water from hot water boiler 411 are controllably run through filters 407-1 to 407-4 via the operations of input valves and pump 403-1 to 403-4 respectively. Lids 405-1 to 405-4 are mechanically connected to input copper tubes 431 while bottom sides 406-1 to 406-4 are mechanically connected to output tanks 408-1 to 408-4 respectively.

Continuing with FIG. 4, boiler temperature and pressure sensor 412, valves and pumps 403-1 to 403-4, Brix % refractometers 409-1 to 409-4, and output valves and pumps 410-1 to 410-4 are electrically coupled to PIDC 424 which is, in turn, electrically coupled to a display 425 via communication channel 433. Communication channel 433 can be either wireless or wires. Wireless communication channel 433 can be Bluetooth™, Wifi™, radio frequency (RF), near field communication (NFC), network-based communication (such as WAN, LAN, etc.), or cloud-based communication that can communicate with communication devices such as smartphones, desktop, laptop, personal digital assistant (PDA), and/or tablets. Alternatively, wire communication channel 433 can be electrical copper conductor types, PVC insulated single-core wires of different power grades such as 300/500 volts or 450/750 volts.

It is noted that boiler temperature and pressure sensor 412, valves and pumps 403-1 to 403-4, Brix % refractometers 409-1 to 409-4, and output valves and pumps 410-1 to 410-4 are well-known in the art and need not be described in details in the present disclosure. In an exemplary embodiment, boiler temperature and pressure sensor 412, input temperature and spressure sensors 404-1 to 404-4 are Scace 2, Coffee Machine thermofilters that give both temperature and pressure readings. Brix % refractometers 409-1 to 409-4 are coffee digital refractometers for measuring coffee Brix and coffee TDS with automatic temperature compensation (ATC). Input valves and pumps 403-1 to 403-4, output valves and pumps 410-1 to 410-4, and boiler pump 413 are electrical pumps which are either vibratory pumps or rotary vein pumps. Vibratory pumps, or vibe pumps, use electromagnetic workhorse: a piston attached to a magnet is set inside a metal coil. Electrical current runs through the coil causing the magnet to rapidly move the piston back and forth, pushing water through the machine. Unlike a vibratory pumps, rotary pumps are mechanical: a motor spins a disc that is offset inside a large, round chamber. The spinning disc is segmented into sections by veins. As the disc spins, the veins press against the wall of the outer chamber, diminishing the size of the section, creating pressure. Water enters in during the large phase and is pushed out as the section shrinks. Both vibratory pumps and rotary vein pumps are well-known in the art and therefore need not to be described in details here.

Figure 5:
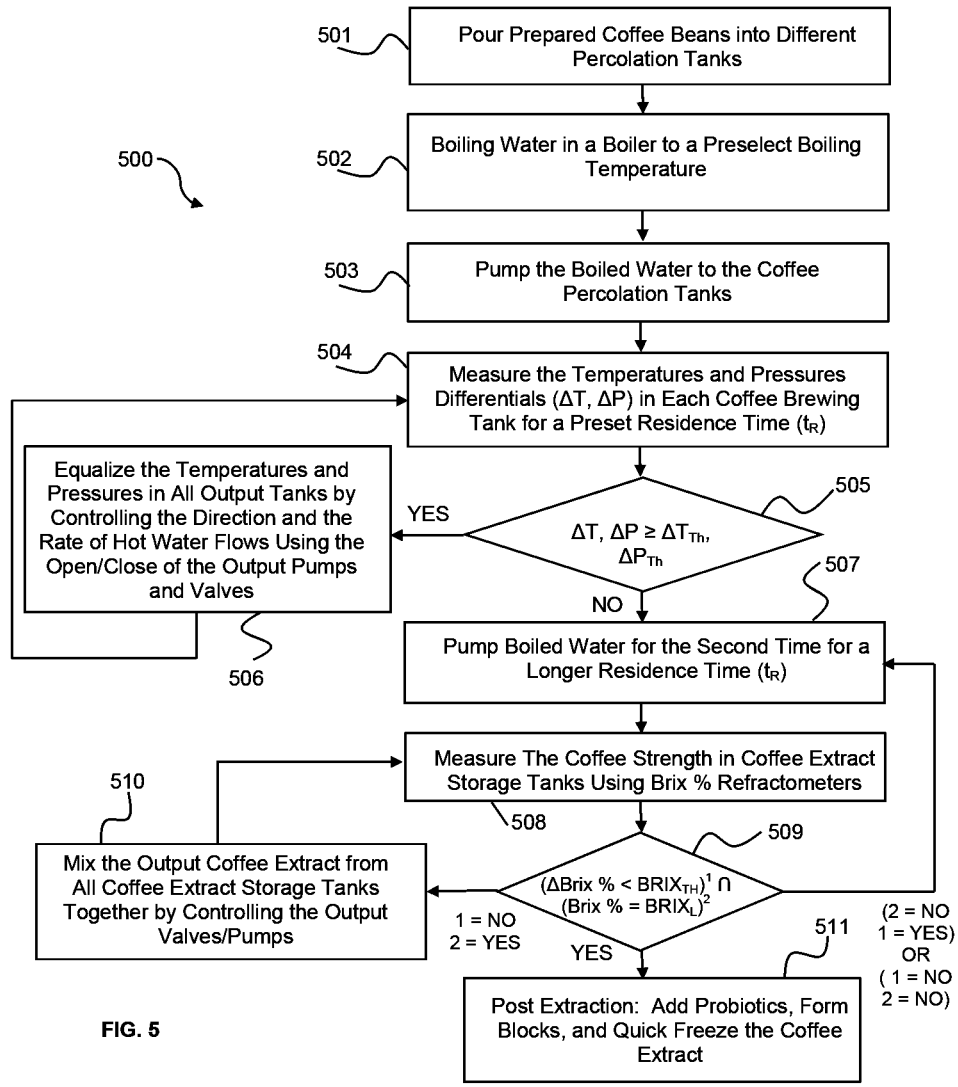
FIG. 5 is a flow chart illustrating a process of extracting coffee using a high-volume smart coffee brewing machine and a convection current vacuum freeze drying apparatus in accordance with an exemplary embodiment of the present invention.

Next referring to FIG. 5, a flow chart of a process of preparing concentrated coffee extract powder (instant coffee) 500 using a convection current vacuum freeze drying apparatus and a high-volume coffee brewing machine is illustrated in accordance with an exemplary embodiment of the present invention. In various embodiments of the present invention, method 500 uses a high-volume coffee brewing machine 400 and convection current vacuum freeze drying apparatus 200 described above in FIG. 4 and FIG. 2 respectively. Method 500 includes (a) pouring the prepared coffee beans into a plurality of percolation tanks; (b) boiling water to preset temperature and pressure; (c) pumping hot water into the plurality of percolation tanks to extract coffee; (d) measuring the temperatures and pressures in each of the percolation tanks; (e) if the differences in temperatures and pressures in the percolation tanks are greater than predetermined errors, (f) equalizing the temperatures and pressures by controlling the input valves and pumps; (g) else, pumping hot water through the plurality of percolation tanks for the second time; (h) repeating the step (f) to (g); (i) measuring the Brix % and the differentials (ΔBrix) for the coffee extract in each coffee extract storage tank (output tanks); (j) performing a Boolean logic $\{\Delta\text{Brix \%}<\text{BRIX}_{TH}\}^1 \Omega (\text{Brix \%} \text{BRIX}_L)^2\}$ to determine the next steps; (k) mixing the output coffee extracts from all percolation tanks by controlling the output valves and pumps if 2 is true and 1 is not true; (m) repeat step (h) if 1 is true and 2 is not and both 1 and 2 are not true; (n) if both 1 and 2 are true, performing the post-extraction step which includes adding probiotics, forming coffee extract blocks or molds, and quick freezing the coffee extract blocks or molds.

Method 500 achieves the following objectives:

(a) the coffee extracts are produced with uniform aroma, fragrance, quality at all times and at industrial scale, which is no possible and a long-felt need in the market; and (b) a precise mathematical calculations are involved at every single step of brewing the coffee extracts without human errors in the determination of quality, quantity, fragrance, aroma, and states.

More specifically, at step 501, percolation tanks are filled with the prepared coffee beans. The coffee beans and/or coffee blends are prepared in accordance with a predetermined quality guidelines. As a non-limiting example, the predetermined quality guidelines to select coffee beans and/or coffee blends are as described in table 1 above which presents the predetermined quality guideline to include selecting only fresh, shiny, coffee beans with little residues, mixing different types of coffee beans (*Robusta, Arabica*, regions, roasts) to create coffee blends with different aromas and tastes roasting the coffee beans/blends to 90° C. for 20-25 minutes, and finally grinding the roasted coffee beans/blends into fragments of 0.2-0.5 mm. Instrumentally, step 501 is realized by percolation tanks 401-1 to 404-4 having input terminals 402-1 to 402-4 respectively.

At step 502, water is boiled at a preselected boiling temperature. In various aspects of the present invention, step 502 is realized by hot water boiler 411 with temperature and pressure sensor 412 configured to sending pressure and temperature data to PIDC 424. The water temperature is essential because if the water is too hot, an over extraction occurs, leaving the coffee tasting bitter. If the water is too cold, an under-extraction shall occur, where the coffee is weak, and maybe even tastes sour. The preset boiling water is between 195° F. to 205° F. (91° C. to 96° C.) for optimal extraction. PIDC 424 is programmed to select the preset boiling temperature which depends on the coffee beans and blends. For *Arabica* and *Robusta* Natural blend, 92° C. is the preselected boiling temperature. For *Robusta* Torrefacto blend, 88° C. is the preselected temperature.

Next, at step 503, the boiled water is pumped into percolation tanks. Please note that step 501-503 do not have to be performed in that order. That is, the water is boiled to the preset boiling temperature, and then the coffee beans and blends are poured into the percolation tanks. In practice, step 503 is realized by hot water boiler 413 which can be either rotary or vibratory pumps.

Next, at step 504, the temperatures, pressures, and residence time ($t_R$) in each percolation tank are again measured. When coffee beans/blends are contacted with boiled water, the coffee extraction begins. The extraction quality depends on the residence time ($t_R$), temperature, pressure, coffee bean sizes, etc. Step 504 is realized by percolation tanks 401-1 to 401-4, temperatures and pressures sensors 404-1 to 404-4, and PIDC 424. The more percolation tanks are used, the more important step 504 is since the temperatures and pressures in each tank vary due to the size and the distances between percolation tanks 401-1 to 401-4.

At step 505, the differential temperature and pressure data from each percolation tank are calculated and compared to a threshold (or preset) to differential mperature and pressure ($\Delta T_{th}$ and $\Delta P_{th}$). Step 505 is realized by PIDC 424. More particularly, temperatures and pressures sensors 404-1 to 404-4 feedback the temperature and pressure data in each respective percolation tanks 404-1 to 404-4 to PIDC 424 via wireless communication channel 433. Upon receipt of these data, PIDC 424 uses a proportional-integral-derivative algorithm ("PID algorithm") to calculate the differentials and compare these differentials to the threshold temperature and a threshold pressure ($\Delta T_{th}$ and $\Delta P_{th}$). This PID algorithm also sets the residence time ($t_R$) for the extraction of the coffee beans/blends. In many embodiments of the present invention, PIDC 424 is a microprocessor, programmable logic array (PLA), a programmable logic controller (PLC) that uses a C-language, ANSI C language, or Assembly language. The detailed operations of smart high-volume coffee brewing machine 400 and PID algorithm will be disclosed in the following steps.

Then, at step 506, if the differential temperature and pressure data are greater than the threshold temperature ($\Delta T_{th}$)) and threshold pressure ($\Delta P_{th}$), the temperature and pressure in each percolation tanks are equalized. Step 506 is realized by PIDC 424, input copper tubes 431, communication channel 433, and input valves and pumps 403-1 to 403-4 which form a feedback control loop. As a non-limiting example, if the differential temperature between percolation tanks 401-2 and 401-3 are less than the threshold temperature ($\Delta T_{th}$). However—due to special arrangement, the ambient weather condition, and the distance—the differential temperature percolation tanks 401-1 and 401-4 are greater than the threshold temperature ($\Delta T_{th}$), PIDC 424 opens valves and pumps 403-1 and 403-4 and at the same time closes valves and pumps 403-2 and 403-3 so that the temperatures will be equalized between the two percolation tanks 401-1 and 401-4. This also means that, the temperature and pressure in each individual percolation tank 401-1 to 401-4 can be set at the preset temperature and pressure by the virtue of PIDC 424.

Next, at step 507, boiled water is pump for a second time at a longer residence time ($t_R$) so as to fully extract the coffee. Again, step 507 is realized by PIDC 424, input copper tubes 431, communication channel 433, and input valves and pumps 403-1 to 403-4. PIDC 424 sets and maintains longer residence time ($t_R$). The longer the boiled water interact with the coffee beans/blends in filers 407-1 to 407-4, the stronger the coffee extract and the higher the $BRIX_L$. In various aspects of the present invention, step 504 and 506 are repeated after step 507 to make sure that the coffee extracts are uniform in all percolation tanks 401-1 to 401-4.

At step 508, the extract coffee in the storage tanks are measured using a Brix % refractometer or a TDS meter. Step 508 is realized by Brix % refractometers 409-1 to 409-4 which feedback these data to PIDC 424 via wireless communication channels 433.

At step 509, the Brix % in each output tank and their differentials are calculated, then a Boolean logic $\{(\Delta \text{Brix} \% < BRIX_{TH})^1 \cap (\text{Brix} \% \ BRIX_L)^2\}$ is calculated to determine the following steps 509 to 511. Step 509 is realized by PIDC 424. $(\Delta \text{Brix} \% < BRIX_{TH})^1$ is set 1 measuring the differential coffee concentrations in each output tank 408-1 to 408-4. That is the differential coffee concentration among output tanks 408-1 to 408-4 are compared a differential threshold level, $BRIX_{TH}$. (Brix $\% \geq BRIX_L$) is set 2 measuring the coffee concentration in each output tank 408-1 to 408-4. That is, the coffee concentration in output tanks 408-1 to 408-4 are compared to a threshold level $BRIX_L$.

Continuing with step 509, in case set 1 is true and set 2 is false or both sets are false, step 507 is repeated for percolation tank 401-1 to 401-4 if the coffee concentration therein is not strong enough. As an example, if the coffee extracts in output tanks 408-2 to 408-4 met the condition as stated in set 2 above, PIDC 424 repeating step 507 for percolation tank 401-1. That is, input valves and pumps 403-2 to 403-4. Only input valves and pump 403-1 is opened and the boiled water from boiler 413 is ran through again until set 1 and set 2 are met for percolation tank 401-1.

Next, at step 510, in case set 1 is false and set 2 is true. That is, the concentration in each output tank 408-1 to 408-2 meets the condition but the differential concentration among them surpass the differential threshold $BRIX_{TH}$, i.e., set 2 is true and set 1 is false, coffee extracts in output tanks that are not equal is equalized by using output valves and pumps. Step 510 is realized by output tanks 408-1 to 408-4, Brix % interferometers 409-1-409-4, and PIDC 424. As an example, if the differentials coffee extracts in output tanks 408-1 to 408-4 fails the condition as stated in set 1 above. That is PIDC 424 opens output valves 410-1 and 410-4 and, at the same time, closes valves 410-2 and 410-3, equalizing the coffee extracts between output tanks 408-1 and 408-4, leaving the other output tanks 408-2 and 408-3 alone. As a result, the coffee extracts between these two output tanks, 408-1 and 408-4, are equalized. Afterward, step 508 is repeated to make sure the Boolean logic is satisfied and the coffee extracts are all uniform and meet the Brix % level.

At step 511, the coffee extracts are added with probiotics, formed blocks, and frozen if set 1 and set 2 in the Boolen logic above are both true. Step 510 is realized by PIDC 424 and post-extraction station 421. As such, PIDC 424 sets set 1 and set 2 to a logic 1 (or YES or TRUE). In this case, the differential coffee concentrations in all output tanks 408-1 to 408-4 are all less than the threshold differential threshold BRIX$_{TH}$; set 1, (ΔBrix %<BRIX$_{TH}$), is 1. On the other hand, the coffee concentration in each output tank 408-1 to 408-4 are all meet the set concentration level BRIX$_L$; or set 2, (Brix % BRIX$_L$), is 1. Probiotics are added to the coffee extracts are *lactobacillus, streptococcus*, and *Bifidobacterium* at an amount of 0.75 g to 1 g per every 100 g of the coffee extracts. Coffee extracts are pourted into blocks or molds which are then passed through a gate 422 to be frozen in an individual quick freezer (IQF) 423. In some other aspects of step 511, sugar and malto syrup can be added to facilitate the molding of the coffee extracts. Yet, in some other aspects of step 510, to increase the sweetness, sugars can be added into the coffee extracts.

Figure 6:
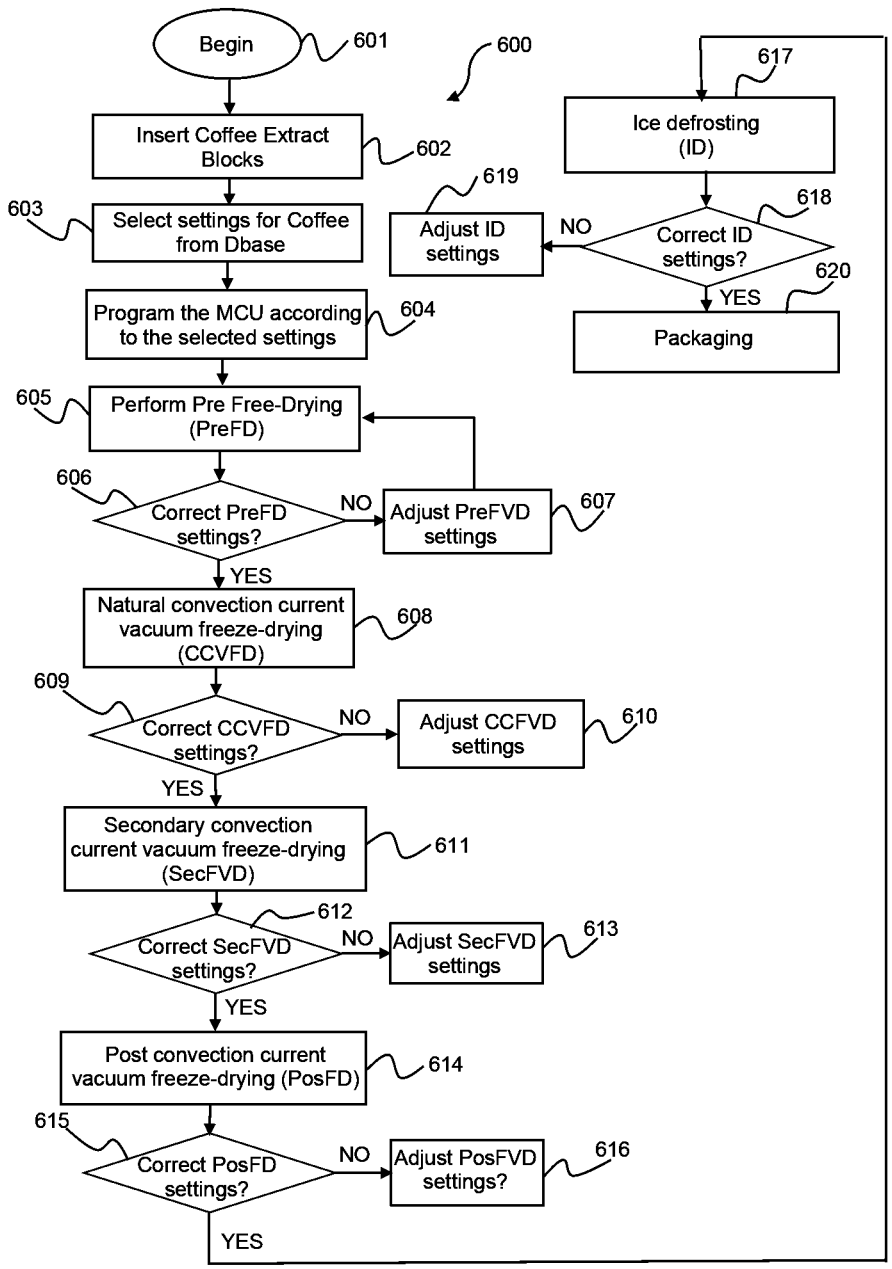
FIG. 6 is a flow chart illustrating a process of operating a convection current vacuum freeze drying apparatus for preparing concentrated coffee extract powder in accordance with an exemplary embodiment of the present invention.

Next referring to FIG. 6, a flow chart illustrating a method 600 of operating convection current vacuum freeze drying apparatus 200 ("apparatus 200") in accordance with an exemplary embodiment of the present invention is illustrated. The operation of apparatus 200 illustrated by process 600 further includes the following operational steps: performing the preliminary convection current vacuum free drying (pre CCVFD) 601-604, performing the primary convection current vacuum free drying (pri CCVFD) 605-608, performing secondary convection current vacuum free drying (sec CCVFD) 609-612, performing post convection current vacuum free drying (post CCVFD) 613-616, and performing ice defrosting 617-620.

In the pri CCFVD operational steps 601-604, the refrigerator unit 230 is started to collect cold air inside and dryer unit 210 and ice condenser unit 220. Discharge water valve 214V and ice condenser discharge valve 225V are closed. Cooling water pump for vacuum pump unit 243P and cooling water valve 243V are switched off. The water circulation in dryer unit 210 is closed off. At the same time, freeze dried chamber-heater hot water valve 212V is switched on. Fans in cooling tower unit 240 is turned on. Cooling water pump 235P is also turned on to cool compressors 231. After compressor 231 are turned on, the temperatures of a plurality of elongate heat exchange tubes with radially arranged fins 226 are recorded via temperature transmitter (also known as thermometer or thermal coupler) 229. Controller unit 201 observes whether the temperature is lowered by 5° C. If it does not, alarm signals are sent out. Controller unit 201 sends diagnostic signals to inspect refrigerator unit 230. If refrigerator unit 230 is normal, trays 211 are loaded with blocks of frozen coffee extract. In some embodiments of the present invention, conveyors (not shown) will thrust trays 611 loaded with the selected coffee extract deep inside dryer unit 210.

At step 601, method 600 begins by cleaning and checking all the electrical as well as mechanical connections between the units are correct and secured as described in FIG. 2 above. All valves, e.g., 212V, 214V, 223V, 225V, 228, 243V, 263V, are released to clear all residual water out of the system and ice defrosting step is performed. In other words, step 601 involves all necessary preparatory steps prior to the vacuum freeze drying process begins. In many aspects of the present invention, step 601 may involve calibration procedure to ensure proper and accurate performance of apparatus 200 in accordance with ISO standards such as ISO 13408. The preparatory steps may include temperature tests such as shelves temperatures tests with and without loads, steam in place (SIP) test to ensure proper sterilization of apparatus 200, and tests for vacuum pump unit 250, etc.

At step 602, coffee extracts in blocks of frozen coffee extracts prepared by process 700 above to be vacuum freeze dried is selected. The coffee beans/blends/roasts are first substantially extracted using smart high-volume coffee brewing machine 400 as described in FIG. 4 above. The frozen blocks made from molds of coffee extract are laid in trays 211. Controller unit 201 and database 202 are informed and programmed to perform the next steps accordingly.

Next, at step 603, specific settings for coffee extracts in step 601 are located from a preconfigured database. The preconfigured database is a database built from careful and thorough prior clinical tests for coffee extract. Clinical tests are performed to obtain specific settings include eutectic temperatures ($T_{eu}$), critical temperatures ($T_C$), triple point or sublimation temperatures ($T_{SUB}$), optimal temperatures ($T_{opt}$), pressures, durations for each phase (t sec), etc. for coffee extract. In many aspects of the present invention, step 603 is implemented by database 202. The specific settings for coffee extract are stored in database 202 such as Look-Up Table (LUT); Read and Write memory; CD-ROM; DVD; HD-DVD; Blue-Ray Discs; etc.; semiconductor memory such as RAM, EPROM, EEPROM, etc.; and/or magnetic memory such as hard-disk drive, floppy-disk drive, tape drive, MRAM, etc. A simple exemplary database in accordance with an exemplary embodiment of the present invention is listed in Table 2 below. Please note that Table 2 is only a simplified example of the database of the present invention. In reality, the database can have other settings listed above which are necessary to carry out an optimal convection current freeze drying process for coffees extracts.

TABLE 2

A Simplified Example of a Vacuum Freeze Drying Database

| Address | Products | Triple Point Temperatures | Pressures |
|---|---|---|---|
| 1 | Pineapple (*Ananas comosus*) | <−20° C. | <0.5 Torr. |
| 2 | Beetroots (*Beta vulgaris*) | <−20° C. | <0.5 Torr. |
| 3 | Durian (*Durio zibethinus*) | <−18° C. | <0.5 Torr. |
| 4 | Kumquats (*Fortunella japonica*) | <−30° C. | <0.1 Torr. |
| 5 | Apples (*Malus dometica*) | <−30° C. | <0.1 Torr. |
| 6 | Pennywort (*Centella asianatica*) | <−20° C. | <0.2 Torr. |
| 7 | Passion Fruits (*Passiflora edulis*) | <−20° C. | <0.5 Torr. |
| 8 | Ambarella Fruits (*Spondias Durcis*) | <−20° C. | <0.2 Torr. |
| 9 | Coconut Milk (*Cocos nucifera*) | <−20° C. | <0.5 Torr. |
| 10 | Soursop fruits (*Annona muricata*) | <−20° C. | <0.5 Torr. |
| 11 | Banana (*Musa*) | <−20° C. | <0.5 Torr. |
| 12 | Jack fruits (*Artocarpus heterophylus*) | <−20° C. | <0.5 Torr. |
| 13 | Dragon fruits (*Hylocerus costaricensis*) | <−20° C. | <0.5 Torr. |
| 14 | Coffee Extract | <−30° C. | 0.4559 Torr. |

Next, at step 604, after all the settings are located in the database, a controller unit is programmed with the above settings. In many exemplary embodiments of the present invention, step 604 is implemented by controller unit 201 which includes, but not limited to, a desktop computer, a laptop computer, a Programmable Logic Controller (PLC), a Supervisory Control and Data Acquisition (SCADA), or any other type of microprocessors or programmable logic array (PLA).

More specifically, in the pri CCFVD operational steps 605-607, the refrigerator unit 230 is started to collect cold air inside and dryer unit 210 and ice condenser unit 220. Discharge water valve 214V and ice condenser discharge valve 225V are closed. Cooling water pump for vacuum pump unit 243P and cooling water valve 243V are switched off. The water circulation in dryer unit 210 is closed off. At the same time, freeze dried chamber-heater hot water valve 212V is switched on. Fans in cooling tower unit 240 is turned on. Cooling water pump 235P is also turned on to cool compressors 231. After compressor 231 are turned on, the temperatures of a plurality of elongate heat exchange tubes with radially arranged fins 226F are recorded via temperature transmitter (also known as thermometer or IoT thermometer) 229. Controller unit 201 observes whether the temperature is lowered by 5° C. If it does not, alarm signals are sent out. Controller unit 201 sends diagnostic signals to inspect refrigerator unit 230. If refrigerator unit 230 is normal, trays 211 are loaded with coffee beans/blends/roasts listed in Table 1. In some embodiments of the present invention, conveyors (not shown) will thrust trays 211 loaded with the selected coffee extract deep inside dryer unit 210.

Continuing with operational steps pre CCVFD 605-607 and FIG. 2, tray temperature transmitters 215 and 216 are moved into position to record tray temperatures during the convection current vacuum freeze drying process. The door (s) of dryer unit 210 are automatically closed by turning on front door switch 217 and rear door switch 218. Sensors will alarm controller unit 201 if doors are not hermetically closed. Cooling water valve 243V and cooling water pump 243P are switched on to cool vacuum pump unit 250. Vacuum isolating valve 223V is tightly switched off so that when vacuum pump unit 250 is turned on it will not be overloaded. Controller unit 201 observes when vacuum pump unit 250 is overloaded. If vacuum pump is overloaded, controller unit 201 tightens up vacuum isolating valve 223V and checks for overloading again. Some time-outs can be provided to apparatus 200 during correction steps. This correction repeats until vacuum pump unit 250 is not overloaded. When this condition happens, controller unit 201 turns on vacuum pump unit 223V by 5% per minute until vacuum pump unit 250 is fully throttled on. At this time, the pre CCVFD operational steps 605-607 end.

At step 605, a preliminary convection current vacuum free drying step (pre CCVFD) is performed. In the implementation of step 605, all the valves and flow meters are turned off so that all main units 210 to 260 are isolated from one another. First, heater unit 260 and the vacuum pump unit 250 are turned off because it is not required in the early stages of the process. Meanwhile, ice condenser unit 220, refrigerator unit 230, and cooling tower unit 240 are turned on. Ice condenser unit 220 is slowly set to a temperature less than the initiation temperature of 5° C. Once this initiation temperature is achieved for a first predetermined time duration, coffee beans/blends/roasts prepared as shown in Table 1 is loaded either manually or by an automatic conveyor which is controlled by controller unit 201. When all trays 211 in dryer unit 210 are finished loading, vacuum pump unit 250 is turned on. Cooling tower valve 243V and vacuum pump isolating valve 223V are turned off. Next, a second predetermined time duration is set by controller unit 201. Finally, vacuum pump unit 250 is checked for overloading. If vacuum pump unit 250 is overloaded, controller unit 201 will reset the second predetermined time duration until the overloading condition is cleared. Then, vacuum pump isolating valve 223V connecting vacuum pump unit 250 and ice condenser unit 220 is slowly opened at a predetermined rate of approximately 5% per minute until this vacuum pump isolation valve 223V is fully opened. Thus, the objective of the pre CCVFD operational step is to set up the initial temperature (less than 5° C.) and slowly turning on vacuum pump unit 220 at a predetermined rate of 5% per minute.

At step 606, the initiation temperature, the first predetermined time duration, the second predetermined time duration, the rate, and other settings of the preliminary convection current vacuum free drying are sensed by sensors and sent to a controller unit. The controller unit compares these observed setting data with those stored in the database and determines whether the preliminary CCVFD is performed correctly. In many embodiments of the present invention, step 606 can be implemented by controller unit 201, database 202, and sensors such as, 215, 216, 219, 225M, 229, 252, 262M, 263, 264, etc. which can be observed remotely by devices such as cell phones, laptops, computers, etc. that are connected to the network. In a preferred embodiment, convection current vacuum freeze drying apparatus 200 of the present invention is network-based. In some embodiments, convection current vacuum freeze drying apparatus 200 of the present invention is a stand-alone machine which is not connected to any network.

At step 607, the settings of the preliminary CCVFD is sensed by the sensors. Similar to step 606, the sublimation temperature ($T_{SUB}$), the third predetermine time duration, the state of the valves are constantly observed. In many embodiments of the present invention, all sensors are network-based devices. Step 607 can be implemented by, controller unit 201, database 202, sensors such as, 215, 216, 219, 225M, 229, 252, 262M, 263, 264, etc. that are connected to a network such as the industrial wireless sensor network (IWSN).

Next at step 608, a primary convection current vacuum free drying (pri CCVFD) operational step is performed. In the primary convection current vacuum drying operational step, the controller unit brings the ice condenser unit well below the triple point (sublimation) temperature of coffee beans/blends/roasts for a third predetermined time duration. Please see Table 1. As an example, when coffee beans/blends/roasts are selected, the sublimation temperature ($T_{SUB}$) is maintained at −20° C. for 11 hours. A vacuum pipe 223V connecting the ice condenser unit 220 and the vacuum pump unit 250 is turned off so that the cold vapors from the ice condenser unit 220 are prevented from entering the vacuum pump unit 250. It will be noted that the eutectic temperatures ($T_{eu}$) of coffee extract are taken into consideration by the controller unit to avoid eutectic melt down of coffee extract. Step 608 can be implemented by controller unit 201, database 202, vacuum freeze dried chamber 210, ice condenser unit 220, refrigerator unit 230 of apparatus 200 described above in FIG. 2.

In the implementations of steps 605-608, the temperatures on convection current heat exchange tubes with fins 226F are lowered and maintained at −20° C. The pressure inside ice condenser unit 220 is lowered to less than 5 Torricelli (torr.). This temperature and pressure are checked at a predetermined time duration of 10 minutes interval. Current intensities of current transformer transmitter 252 are reported. Tray temperatures from tray temperature transmitters 215 and 216 are also observed.

If the process proceeds normally, at −20° C. and 5 Torr., the water in frozen coffee extract blocks in trays 311 will be frozen solid for about an hour. Then, valve 212V is turned on to circulate hot water to pipes (not shown) underneath trays 211 in order to bring the tray temperature to 5° C. for 11 hours. This time duration is specific to coffee beans/blends/roasts. See Table 2. Controller unit 201 searches database 202 to select the correct this time duration for coffee extract. During this time duration, all frozen water will be transformed directly to gaseous phase without becoming liquid first.

At step 609, the settings of the primary CCVFD is sensed by the sensors. Similar to step 608, the sublimation temperature, the third predetermine time duration, the state of the valves are constantly observed. In many embodiments of the present invention, step 609 can be implemented by controller unit 201, database 202, and sensors such as, 215, 216, 219, 225M, 229, 252, 262M, 263, 264, etc.

At step 610, if any of the settings is not correct, the controller unit or any devices that are connected to the network can alarm and adjust the settings so that the optimal primary CCVFD results can be achieved. In many embodiments of the present invention, step 610 can be implemented by controller unit 201, database 202, and sensors such as, 215, 216, 219, 225M, 229, 252, 262M, 263, 264, etc.

At step 611, after correct the settings of the primary CCVFD, the controller unit goes to the secondary convection current vacuum freeze-drying (sec CCVFD) step. A time-out may be imposed on the system until all incorrect settings are adjusted. In many embodiments of the present invention, step 611 can be implemented by controller unit 201.

At step 612, secondary convection current vacuum freeze drying (sec CCVFD) step is performed. In this step, the pressure is lowered to the triple point (sublimation) and a fourth time duration is set. In the case of coffee extract is being freeze dried this fourth time period is 10 minutes. Then the tray temperatures are increased by 5° C. step by a fifth time duration of about 30 minutes. Finally, tray temperatures are held at 5° C. for a sixth predetermine time duration of about 8 hours so that all remaining frozen solutes in coffee extract change directly into vapor phases without becoming liquid. In step 612, heater unit is turned on and the all the valves are connecting the dryer unit and the heater unit are opened. Step 612 can be implemented by controller unit 201, database 202, vacuum freeze dried chamber 210, ice condenser unit 220, refrigerator unit 230, cooling tower unit 240, vacuum pump unit 250, and heater unit 260 of apparatus 200 described above in FIG. 2.

At step 613, the settings of the secondary CCVFD is sensed by the sensors. Similar to step 612, the sublimation temperatures ($T_{SUB}$), pressures, tray temperatures, and the predetermine time durations are constantly observed. In many embodiments of the present invention, step 613 can be implemented by controller unit 201, database 202, and sensors such as, 215, 216, 219, 225M, 229, 252, 262M, 263, 264, etc.

To summarize steps 610-613, operation step (sec CCVFD) is very similar to the pri CCVFD steps 604-609 except that the temperatures inside dryer unit 210 are increased to about 65° C. by turning on the circulation of hot water from heater unit 260. Trays 211 are heated up by the vapors from coffee extract during the convection current vacuum freeze drying process. The sec CCVFD step aims is to vaporize the remaining water from the coffee extract.

Now referring to step 614, a post convection current vacuum freeze drying (post CCVFD) operational step is performed. In this step, the refrigerator unit, the vacuum pump unit, the cooling tower unit are turned off in that specific order for a seventh predetermined time duration prior to the release of the vacuum unit valve to avoid damaging the dried coffee extract. In many aspects of the present invention, step 614 can be implemented by controller unit 201, database 202, vacuum freeze dried chamber 210, ice condenser unit 220, refrigerator unit 230, cooling tower unit 240, vacuum pump unit 250, and heater unit 260 of apparatus 200 described above in FIG. 2.

At step 615, the settings of the post CCVFD is sensed by the sensors. Similar to step 612, the temperatures, flow meters, pressures, and the predetermine time durations are constantly observed. In many embodiments of the present invention, step 615 can be implemented by controller unit 201, database 202, and sensors such as, 215, 216, 219, 225M, 229, 252, 262M, 263, 264, etc.

At step 616, if any of the settings is not correct, the controller unit or any devices that are connected to the network can alarm and adjust the settings so that the optimal post CCVFD results can be achieved. After correct the settings of the post CCVFD, the controller unit continues step 614. A time-out may be imposed on the system until all incorrect settings are adjusted. In many embodiments of the present invention, step 616 can be implemented by controller unit 201, database 202, and sensors such as, 215, 216, 219, 225M, 229, 252, 262M, 263, 264, etc.

Post convection current vacuum freeze drying (post CCVFD) steps 614-616 are performed in apparatus 200. First, vacuum isolating valve 223V is turned off to prevent oils of vacuum pump unit 250 from entering ice condenser unit 220. Compressors 231 and cooling water pump 235P are switched off. Then freeze dried chamber-heater hot water valve 212V and freeze dried chamber heater hot water pump 212P are turned off. Cooling water pump 243P is turned off. At this moment, heater unit 260 ceases to provide heat energy to dryer unit 210. Thirty seconds (30 seconds) from the time vacuum isolating valve 223V is completely turned off, vacuum pump unit 250 is turned off. Cooling water valve 343V is turned off and [[and]] cooling water pump 243 is locked. Then fans in cooling tower unit 240 are turned off. Vacuum release valve 228 is opened to bring the pressure inside ice condenser unit 220 to the atmospheric pressure (1 atm). A one-minute time-out is given to apparatus 200 before discharge water valve 214V is opened. Front door switch 217 and rear door switch 218 are released. Vacuum freeze coffee extract powder can now be collected and packaged. Now, controller unit 201 can calculate the amount of water extracted from coffee extract by subtracting the amount of water recorded on flow meter 225M from that on flow meter 262M.

In some implementations, method 600 may include step 617, an ice defrosting (ID) operational step is performed. In this step, water vapors from coffee extract after sublimation is forwarded to the heater unit to use the latent heat to defrost the ice crystals formed on the fins of the heat exchange tubes.

At step 618, the settings of the ID are sensed by the sensors. Similar to step 617, the temperatures of the heater unit are sensed. In many aspects of the present invention, step 618 can be implemented by controller unit 201, database 202, vacuum freeze dried chamber 210, ice condenser unit 220, refrigerator unit 230, cooling tower unit 240, vacuum pump unit 250, and heater unit 260 of apparatus 200 described above in FIG. 2.

At step 619, if any of the settings is not correct, a controller unit or any devices that are connected to the network can alarm and adjust the settings so that the optimal defrosting results can be achieved. In many embodiments of the present invention, step 619 can be implemented by controller unit 201, database 202, and sensors such as, 215, 216, 219, 225M, 229, 252, 262M, 263, 264, etc.

At step 620, after correct the settings of the ID, the controller unit continues step 618. A time-out may be imposed on the system until any of the incorrect settings are adjusted and all the ice are cleared. In many embodiments of the present invention, step 620 can be implemented by controller unit 201.

Still referring to FIG. 6, next ice defrosting (ID) steps 618-620 are performed in apparatus 200. First, water level of heater unit 260 is measured by high water level sensor 264 and low water level sensor 265. If the water level is low, water can be refilled via feed water tube 262 and feed water valve 262V. Three-phase heating elements 261 of heater unit 260 are turned on to defrost all the ice in ice condenser unit 220. The temperature or amount of heat to defrost depend on the amount of ice formed inside ice condenser unit 220. In some situations, this temperature can reach 90° C. After the ice defrosting operation is complete, three-phase heating elements 261 are turned off. Circular heat water pump 224P is turned off. The efficiency of the convection current vacuum freeze drying process can be calculated by subtracting the amount of input water provided to heater unit 260 measured on flow meter 262M from the amount of output water measured on flow meter 225M.

Finally at step 621, the entire convection current vacuum freeze drying process 800 ends.

Implementations of process 600 disclosed above achieve the following objectives:

A precise step-by-step procedure including predetermined time durations, temperatures, pressure, flow rate, cooling rates are constantly observed and adjusted to that optimal vacuum freeze drying process can be achieved for coffee extract.

A fully automatic and control with minimal human involvements so that errors can be avoided, good dried coffee extract can be guaranteed, and efficiency can be achieved.

High cooling rate is achieved due to the use of the natural convection currents of the present invention.

Aspects of the present invention are described above with reference to flowchart illustrations and/or block diagrams of methods, apparatus (systems) and computer program coffee extract according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a apparatus, such that the instructions, which execute via the processor of the computer or other programmable data processing apparatus, create means for implementing the functions/acts specified in the flowchart and/or block diagram block or blocks.

As alluded above, the Boolean logic described above can be used with different identities for measuring the strength of coffee extracts such as extraction, extraction yield %, TDS, strength, brew ratio. Extraction is known as "solubles yield" or "Extraction Yield". It is the percentage (by weight) of the grounds are dissolved in the water. Put simply, how much of the coffee beans/blends in percolation tanks 401-1 to 401-4 ends up in output tanks 408-1 to 408-4 respectively. Extraction yield % is the percentage by mass of coffee grounds that ends up dissolved in the brewed coffee. Extraction yield %=Brewed Coffee[g]×TDS[%]/Coffee Grounds [g]. Total Dissolved Solids (TDS) is expressed in parts per million (ppm). Strength is also known as "solubles concentration", as measured by TDS how concentrated or watery the coffee is. Brew ratio is the ratio of coffee grounds (mass) to water (volume): how much coffee is used for a given quantity of water. This may be expressed in units of either grams per liter or ounces per US half gallon. These are related as follows: Strength=Brew ratio×Extraction which can be analyzed as the following identity: dissolved solids/water=grounds/water×dissolved solids/grounds.

Computer program code for carrying out operations for aspects of the present invention such as process 500 and 600 may be written in any combination of one or more programming languages, including an object oriented programming language such as Python, Java, Smalltalk, C++, Ladder logic, FBD, ST, IL, SFC, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

| | |
|---|---|
| 100 | system for preparing concentrated coffee extract powder |
| 103 | mechanical connectors between units of the system 100 |
| 104 | communication channels between controller the system |
| 110 | high-volume smart coffee brewing machine |
| 120 | coffee extract block forming engine |
| 130 | pre-freezing individual quick freezer (IQF) |
| 200 | an exemplary convection vacuum freeze drying apparatus |
| 201 | controller unit of the exemplary CCVFD |
| 202 | database of the exemplary CCVFD |
| 203 | mechanical connectors between units of the CCVFD |
| 204 | communication channels of the exemplary CCVFD |
| 211 | freeze Dried Trays (trays) |
| 212 | hot water pipe |
| 212V | freeze dried chamber-heater hot water valve |
| 212P | freeze dried chamber-heater hot water pump |
| 213 | return water pipe |
| 214 | discharge water pipe |
| 214V | discharge water valve |
| 215 | first tray temperature transmitter |
| 216 | second tray temperature transmitter |
| 217 | front door switch |
| 218 | rear door switch |
| 219 | vacuum pressure transmitter |
| 220 | convection current condensing unit (Condenser) |
| 221 | large ice condenser, freeze dried chamber connection pipe |
| 222a | liquid refrigerant pipe |
| 222b | gaseous refrigerant pipe |
| 223 | vacuum pipe |
| 223V | vacuum isolating valve |
| 224 | ice condenser heater hot water pipe |
| 224V | ice condenser heater hot water valve |
| 224P | ice condenser heater hot water pump |
| 225 | ice condenser discharge valve |
| 225M | ice condenser discharge flow meter |
| 225V | ice condenser discharge valve |
| 226 | convection current heat exchanging tubes without fins |
| 226F | convection current heat exchanging tubes with fins |
| 227 | expansion capillary tubes |
| 228 | vacuum release valve |
| 229 | ice condenser temperature transmitter |
| 230 | refrigerator unit |
| 231 | compressor |
| 232 | refrigerant container |
| 233 | liquid refrigerant heat exchanger |
| 234 | refrigerant heat exchanger |
| 235 | cooling water pipe |
| 235P | cooling water pump |
| 240 | cooling tower unit |
| 241 | feed water pipe |
| 241V | feed water valve |
| 242 | hot water returning pipe |
| 243 | cooling water pipe for vacuum pump unit |
| 243P | cooling water pump for vacuum pump unit |
| 243V | cooling water valve for vacuum pump unit |
| 250 | vacuum pump unit |
| 251 | vacuum input pipe |
| 252 | current transformer transmitter of the vacuum pump unit |
| 260 | water heater unit (heater) |
| 261 | three-phase heating element |
| 262 | feed water pipe for heater |
| 262M | feed water flow meter for heater |
| 262V | feed water valve for heater |
| 263 | heater temperature transmitter |
| 264 | high water level sensor |
| 265 | low water level sensor |
| 300 | internal structure of convection current ice condenser unit |
| 301 | rectangular base |
| 310 | input reinforcement plate for top array |
| 311 | first elongate heat exchange tube with fins |
| 312 | curved connecting tubes for top array |
| 320 | input reinforcement plate for bottom array |
| 322 | second elongate heat exchange tube without fins |
| 322a | cold gas input from the refrigerator unit |
| 322b | warm liquid output |
| 323 | curved connecting tube for bottom array |
| 326 | bottom array of second elongate heat exchange tubes |
| 326F | top array of first elongate heat exchange tubes |
| 400 | high-volume smart coffee brewing machine |
| 401-1 | first percolation tank |
| 401-2 | second percolation tank |
| 401-3 | third percolation tank |
| 401-4 | fourth percolation tank |
| 402-1 | coffee beans input for the first percolation tank |

-continued

| | |
|---|---|
| 402-2 | coffee beans input for the second percolation tank |
| 402-3 | coffee beans input for the third percolation tank |
| 402-4 | coffee beans input for the first percolation tank |
| 403-1 | top pump for the first percolation tank |
| 403-2 | top pump for the second percolation tank |
| 403-3 | top pump for the third percolation tank |
| 403-4 | top pump for the fourth percolation tank |
| 404-1 | time, pressure, and temperature for the first percolation tank |
| 404-2 | time, pressure, temperature for the second percolation tank |
| 404-3 | time, pressure, temperature for the third percolation tank |
| 404-4 | time, pressure, temperature for the fourth percolation tan |
| 405-1 | top side of the first percolation tank |
| 405-2 | top side of the second percolation tank |
| 405-3 | top side of the third percolation tank |
| 405-4 | top side of the fourth percolation tank |
| 406-1 | bottom side of the first percolation tank |
| 406-2 | bottom side of the second percolation tank |
| 406-3 | bottom side of the third percolation tank |
| 406-4 | bottom side of the fourth percolation tank |
| 407-1 | first coffee filter of the first percolation tank |
| 407-2 | second coffee filter of the second percolation tank |
| 407-3 | third coffee filter of the third percolation tank |
| 407-4 | fourth coffee filter of the fourth percolation tank |
| 408-1 | first output tank |
| 408-2 | second output tank |
| 408-3 | third output tank |
| 408-4 | fourth output tank |
| 409-1 | first Brix % refractometer (TDS measurment) |
| 409-2 | second Brix % refractometer (TDS measurment) |
| 409-3 | third Brix % refractometer (TDS measurment) |
| 409-4 | fourth Brix % refractometer (TDS measurment) |
| 410-1 | output valve and pump for the first percolation tank |
| 410-2 | bottom pump for the second percolation tank |
| 410-3 | bottom pump for the third percolation tank |
| 410-4 | bottom pump for the fourth percolation tank |
| 411 | hot water boilder |
| 412 | temperature sensor hot water boiler |
| 413 | main water pump (rotary or vibrational) |
| 421 | post-extraction station |
| 422 | gate |
| 423 | IQF |
| 424 | proportional integral derivative controller (PIDC) |
| 425 | display |
| 431 | copper fluid tubes |
| 432 | electrical communication channel |

What is claimed is:

1. A coffee extract powder (instant coffee) obtained by the following steps:
    (a) selecting and preparing coffee beans by a predetermined quality guideline;
    (b) obtaining coffee extract using a high-volume coffee brewing machine which further includes a plurality of percolation tanks whose fluid inter-communication is controlled by a proportional integral derivative controller (PIDC) after receiving time, temperature, and pressure data from said plurality of percolation tanks so that a quality of said coffee extract is preserved;
    (c) adding probiotics into said coffee extract;
    (d) freezing said coffee extract mixed with said probiotics in frozen coffee extract molds using an individual quick freezer (IQF) to obtain frozen coffee extract blocks; and
    (e) vacuum freezing said frozen coffee extract blocks using a convection current vacuum freeze drying apparatus.

2. The coffee extract powder of claim 1 wherein said predetermined quality guideline comprises:
    selecting and mixing coffee beans of different types into a mixture of coffee beans having an aroma and taste; and
    simmering said mixture of coffee beans at a temperature of 90° C. for 20 to 25 minutes; and
    grinding said mixture of coffee beans to reduce said coffee beans into coffee particles each having a size between 0.2 to 0.5 mm.

3. The coffee extract powder of claim 1 wherein said high-volume coffee brewing machine further comprises:
    a hot water boiler having a first sensor;
    a water pump, in fluid communication with said hot water boiler, having a second sensor;
    said plurality of groundhead tanks, each having a third sensor;
    a plurality of coffee extract containers mechanically connected to said plurality of said groundhead tanks; and
    said proportional integral derivative controller (PIDC) electrically coupled to receive time, temperature, and pressure data from said first sensor, said second sensor, and said third sensors; wherein said PIDC controls said fluid communication between said hot water boiler, said water pump, and said plurality of groundhead tanks after receiving said temperature, time, and pressure data.

4. The coffee extract powder of claim 3 wherein said high-volume coffee brewing machine further comprises:
    a plurality of input valves and pumps, mechanically coupled to control an amount of hot water and steam that enter into each of said plurality of percolation tanks; and
    a plurality of output valves and pumps, mechanically coupled to control a flowing rate of coffee extract from said plurality of percolation tanks into said plurality of coffee extract containers.

5. The coffee extract powder of claim 4 further comprising a coffee extract block forming section, mechanically coupled and in fluid communication to said plurality of coffee extract containers.

6. The coffee extract powder of claim 5 wherein said PIDC controls said fluid inter-communication by a Boolean logic that equals to $\{\Delta Brix \% < BRIX_{TH})^1 \cap (Brix \% \geq BRIX_L)^2\}$, wherein $\Delta Brix \%$ is differentials in a Brix percentage (%) between said coffee extract, $BRIX_{TH}$ is a threshold differential level, a Brix % is said quality of said coffee extract, $BRIX_L$ is a preset BRIX level of said coffee extract, and $\cap$ is a Boolean logic AND operation.

7. The coffee extract powder of claim 5 wherein said probiotics further comprises *lactobacillus, streptococcus*, and *Bifidobacterium* at an amount of 0.75 g to 1 g per every 100 g of said coffee extract.

8. The coffee extract powder of claim 7 further comprising adding malto syrup into into said coffee extract at a weight ratio of 10%-20% at said coffee extract block forming section.

9. The coffee extract powder of claim 7 further comprising an individual quick freezer (IQF), electrically coupled to said PIDC, operative to freeze said coffee extract to −40° C. to −35° C. for 25 minutes to 30 minutes into said frozen coffee extract blocks.

10. The coffee extract powder of claim 1 wherein said vacuum freezing step further comprises:
    loading specific freeze drying settings for said coffee extract from a database into a controller unit;
    using said controller unit to cause said convection current vacuum freeze drying apparatus to perform said vacuum freezing step in accordance with said specific freeze drying settings for said coffee extract;
    measuring real-time operational parameters from said convection current vacuum freeze drying apparatus during said vacuum freezing step is performed;

comparing said specific freeze drying settings for said specific coffee beans/blends/roasts with said real-time operational parameters to obtain operational differences;
if said operational differences are less than a predetermined error range, continuing said vacuum freezing step until finished; otherwise, adjusting said real-time parameters of said convection current vacuum freeze drying apparatus until said differences in operations are less than said predetermined error range; wherein said convection current vacuum freeze drying apparatus further comprises a dryer chamber unit, a convection current condenser unit comprising a plurality of elongate heat exchange tubes each having fins arranged around an outer circumference of said plurality of elongate heat exchange tubes, a refrigerator unit, a cooling tower unit, a primary vacuum pump unit, and a heater unit.

11. A system for preparing a coffee concentrated extract powder (instant coffee), comprising:
a high-volume coffee brewing machine comprising a plurality of percolation tanks whose fluid inter-communication is controlled by a proportional integral derivative controller (PIDC) after receiving time, temperature, and pressure data from said plurality of percolation tanks so that said coffee extract is qualitatively constant in each of said plurality of percolation tanks;
a convection current vacuum freeze drying apparatus comprising:
a dryer chamber unit comprising a plurality of trays for depositing coffee extract blocks to be freeze dried;
a convection current condenser unit, mechanically connected to said dryer chamber unit, comprising a plurality of first elongate heat exchange tubes, each of said plurality of first elongate heat exchange tubes having fins arranged around an outer circumference of each of said plurality of first elongate heat exchange tubes, wherein said plurality of first elongate heat exchange tubes substantially fill an internal volume of said convection current condenser unit;
a refrigerator unit mechanically connected to said convection current condenser unit, operable to provide a cold refrigerant gas to said plurality of first elongate heat exchange tubes;
a cooling tower unit mechanically connected to said convection current condenser unit;
a primary vacuum pump unit, mechanically connected to said convection current condenser unit and said cooling tower unit, operable to provide a vacuum pressure to said convection current condenser unit; and
a heater unit mechanically connected to provide a heat energy to both said dryer chamber unit and said convection current condenser unit;
a controller unit; and
a database electrically coupled to communicate with said controller unit, wherein said controller unit is electrically coupled to control and receive sensed operational settings from said dryer chamber unit, said convection current condenser unit, said refrigerator unit, said cooling tower unit, said primary vacuum pump unit, and said heater unit, wherein said database is configured to store predetermined operational settings and wherein said controller unit is operable to compare said sensed operational settings and said predetermined operational settings.

12. The system of claim 11 wherein said high-volume coffee brewing machine further comprises:
a hot water boiler having a first sensor;
a water pump, in fluid communication with said hot water boiler, having a second sensor;
said plurality of groundhead tanks, each having a third sensor;
a plurality of coffee extract containers mechanically connected to said plurality of said groundhead tanks; and
said proportional integral derivative controller (PIDC) electrically coupled to receive time, temperature, and pressure data from said first sensor, said second sensor, and said third sensors; wherein said PIDC controls said fluid communication between said hot water boiler, said water pump, and said plurality of groundhead tanks after receiving said temperature, time, and pressure data.

13. The system of claim 12 wherein said high-volume coffee brewing machine further comprises:
a plurality of input valves and pumps, mechanically coupled to control an amount of hot water and steam that enter into each of said plurality of percolation tanks; and
a plurality of output valves and pumps, mechanically coupled to control a flowing rate of coffee extract from said plurality of percolation tanks into said plurality of coffee extract containers.

14. The system of claim 12 further comprising a coffee extract block forming section, mechanically coupled and in fluid communication to said plurality of coffee extract containers.

15. The system of claim 12 wherein said plurality of first elongate heat exchange tubes forms a three-dimensional N×M×L array of first elongate heat exchange tubes, where N is a number of said plurality of first elongate heat exchange tubes arranged in a first direction and M is a number of said plurality of first elongate heat exchange tubes arranged in a second direction, and each of said plurality of first elongate heat exchange tubes has a length L extended in a third direction, wherein said L, M, and N are non-zero integers.

16. The system of claim 15 wherein each column of said three-dimensional N×M×L array comprises vertical zig-zag heat exchange tubes formed by said N of said plurality of first elongate heat exchange tubes.

17. The system of claim 16 wherein each of said vertical zig-zag heat exchange tubes are arranged in a horizontally staggered manner and strung together by first curved connecting tubes which alternatively connect two proximate ends and two distal ends of two adjacent said plurality of first elongate heat exchange tubes so that said vertical zig-zag elongate tubes are configured to receive a cold refrigerant gas from said refrigerator unit via said vertical zig-zag tubes located at the bottom row of said N×M×L matrix and to output a warm refrigerant liquid back to said refrigerator unit via said vertical zig-zag tubes located at the bottom row of said N×M×L matrix.

18. The system of claim 17 wherein said convection current condenser unit further comprises a three-dimensional M×N×L array of a plurality of second elongate tubes without fins, wherein said three-dimensional M×N×L array of said plurality of first elongate tubes is fixed on top of said M×N×L array of said plurality of second elongate tubes without fins.

19. The system of claim 18 wherein each column of said three-dimensional N×M×L array of a plurality of second elongate tubes without fins comprises N of said plurality of second elongate heat exchange tubes without fins arranged in a horizontally staggered manner and strung together by second curved connecting tubes which alternatively connect two consecutive proximate ends and two consecutive distal ends of two adjacent of said plurality of second elongate heat exchange tubes without fins so as to form second vertical zig-zag elongate tubes configured to receive a cold refrigerant gas from said refrigerator unit via said second vertical zig-zag elongate tubes located at the bottom row of said N×M×L array and output a warm refrigerant liquid back to said refrigerator unit via said second vertical zig-zag elongate tubes located at the top row of said N×M×L array of said three-dimensional N×M array; wherein M equals to 8 and N equals to 12 and wherein each of said plurality of second elongate heat exchange tubes has a length of 30 mm, a radius of 35 mm and a thickness of 3.4 mm.

20. The system of claim 19 wherein each of said plurality of first elongate heat exchange tubes further comprises a cylindrical tube and five rectangular fins arranged around an outer circumference of said cylindrical tube, wherein one of said five rectangular fins is located on top of said cylindrical tube and four rectangular fins are arranged on lateral sides of said cylindrical tube pointing downward so as to prevent ice and water from being collected on said cylindrical tube which is made of an aluminum alloy and has a circumference of 89.9 mm, a radius of 35 mm and a thickness of 3.4 mm and wherein said rectangular fin has a width of 30 mm and a length of 30 mm and a thickness of 4 mm.

\* \* \* \* \*